United States Patent
Hirasawa et al.

(10) Patent No.: US 6,473,120 B2
(45) Date of Patent: *Oct. 29, 2002

(54) IMAGE PICKUP APPARATUS FOR APPLYING PREDETERMINED SIGNAL PROCESSING IN CONJUNCTION WITH AN IMAGE SHIFTING MECHANISM

(75) Inventors: Masahide Hirasawa, Sagamihara; Koji Takahashi, Chigasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,826

(22) Filed: Aug. 12, 1997

(65) Prior Publication Data

US 2002/0057346 A1 May 16, 2002

(30) Foreign Application Priority Data

Aug. 13, 1996 (JP) ............................................ 8-213739
Aug. 13, 1996 (JP) ............................................ 8-213740
Aug. 13, 1996 (JP) ............................................ 8-213741

(51) Int. Cl.[7] ........................ H04N 5/225; H04N 5/228
(52) U.S. Cl. ...................... 348/208; 348/219; 348/220; 348/240; 348/296; 396/55
(58) Field of Search ............................... 348/208, 219, 348/220, 240, 296; 396/55; H04N 5/225, 5/228, 5/262

(56) References Cited

U.S. PATENT DOCUMENTS

| | | | | |
|---|---|---|---|---|
| 4,546,390 A | * | 10/1985 | Konishi et al. | 348/220 |
| 4,612,581 A | * | 9/1986 | Endo et al. | 348/219 |
| 5,057,943 A | | 10/1991 | Takahashi | 358/496 |
| 5,313,289 A | | 5/1994 | Nagane et al. | 358/475 |
| 5,402,171 A | * | 3/1995 | Tagami et al. | 348/219 |
| 5,430,484 A | | 7/1995 | Nagane et al. | 348/370 |
| 5,815,199 A | * | 9/1998 | Palm et al. | 348/143 |
| 5,889,553 A | * | 3/1999 | Kino et al. | 348/218 |
| 5,907,353 A | * | 5/1999 | Okauchi | 348/218 |
| 5,969,757 A | * | 10/1999 | Okada et al. | 348/219 |
| 6,018,363 A | * | 1/2000 | Horii | 348/219 |

FOREIGN PATENT DOCUMENTS

JP  7-294988  * 11/1995  ............ G03B/5/00

* cited by examiner

Primary Examiner—Ngoc-Yen Vu
(74) Attorney, Agent, or Firm—Fitzpatrick, Cella, Harper & Scinto

(57) ABSTRACT

An image pickup apparatus is provided with a pixel shifting device for shifting the incident light entering the image pickup device thereby substantially improving the resolution, and an image memory, and adapted to prevent deterioration of the resolution in case of reading a partial image from the image memory, by increasing the resolution using the pixel shifting device.

7 Claims, 27 Drawing Sheets

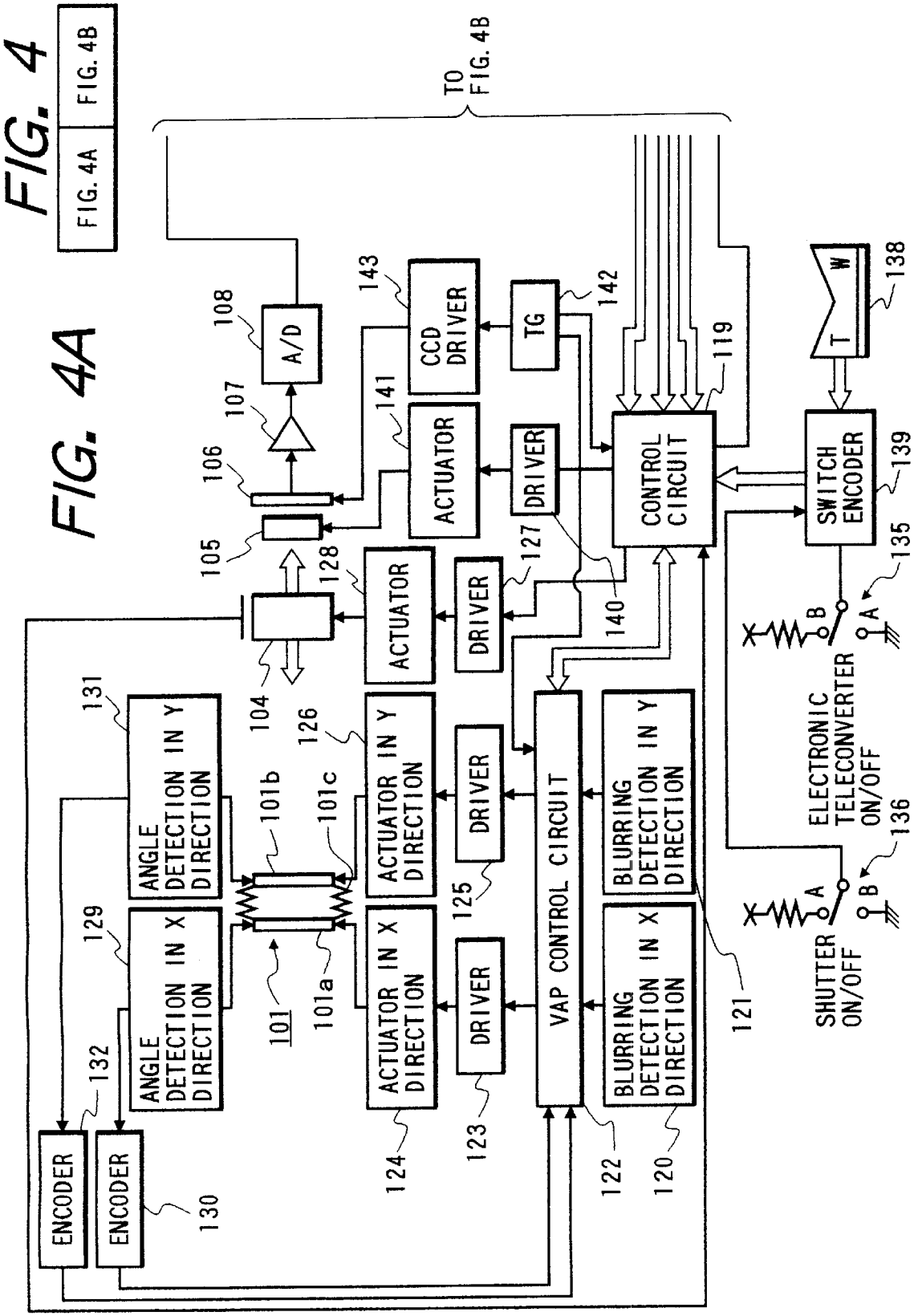

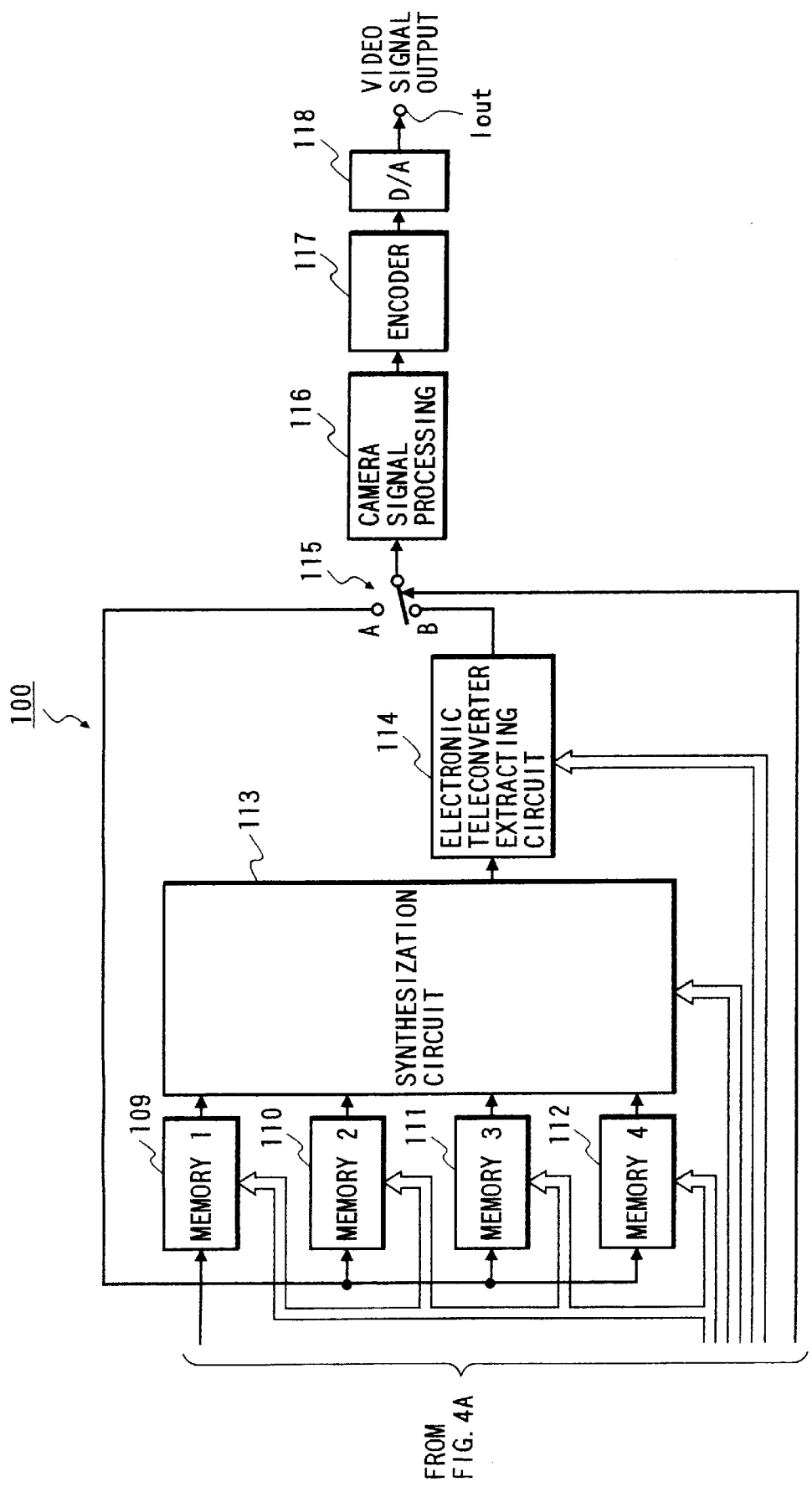

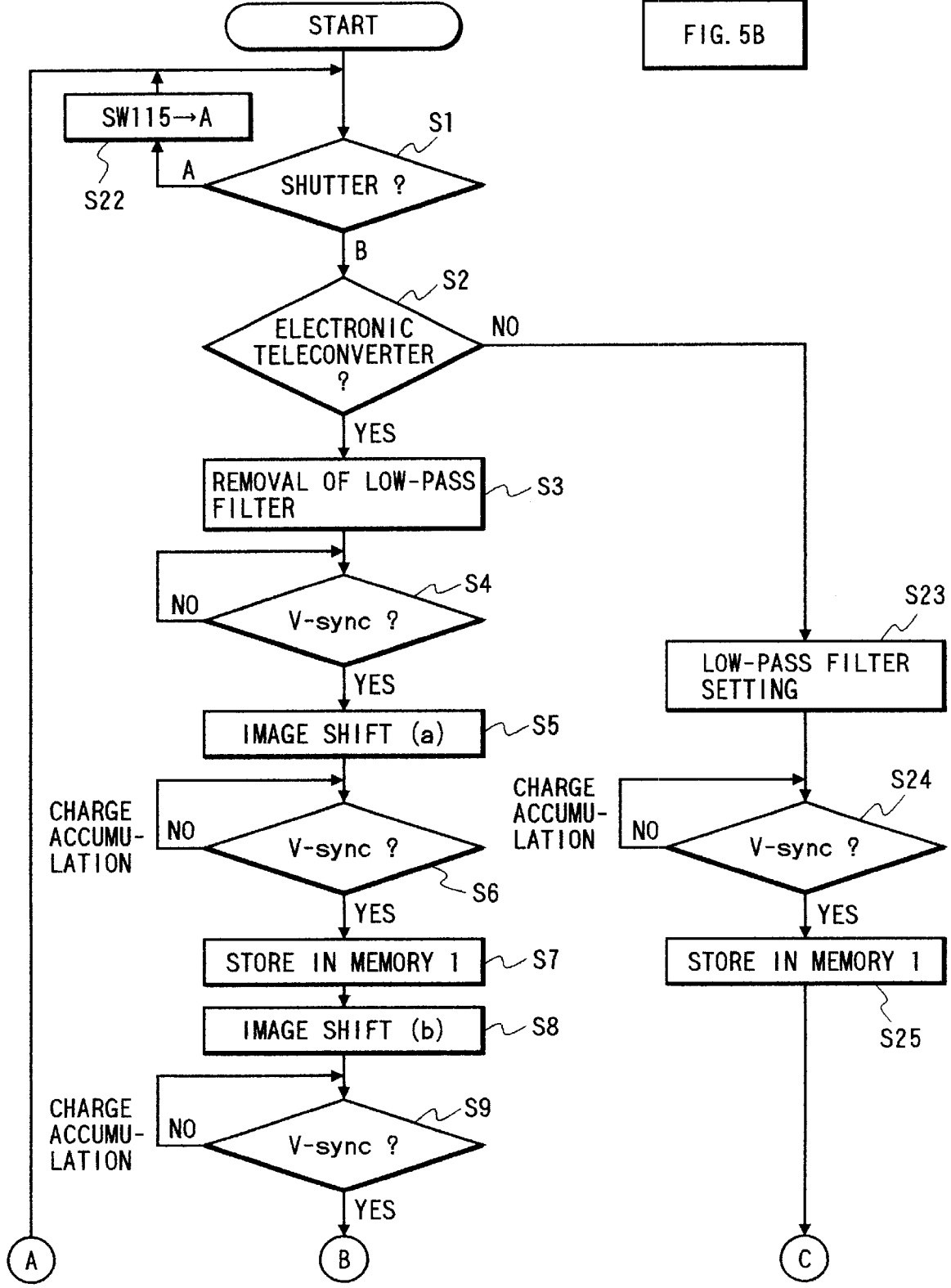

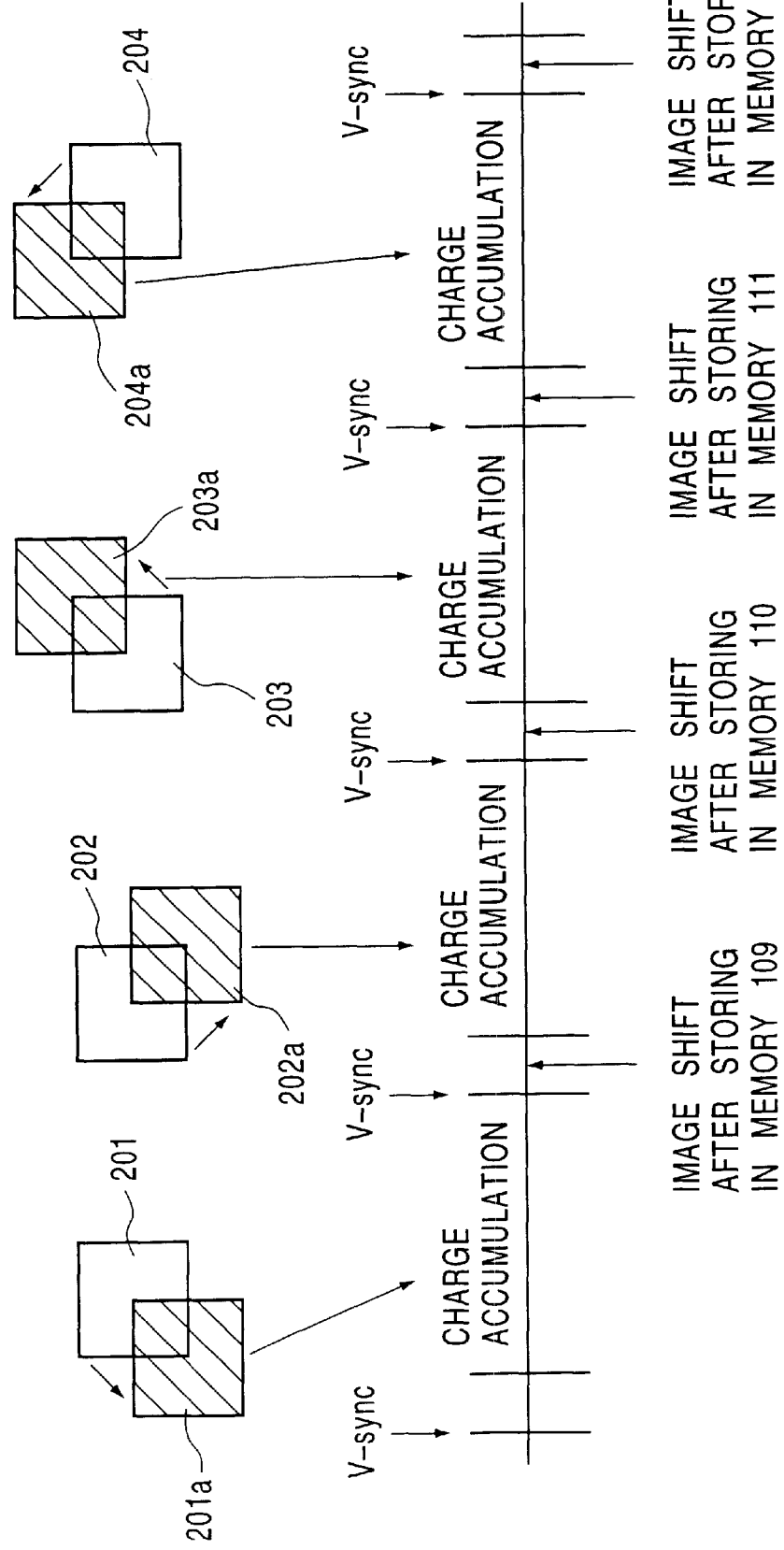

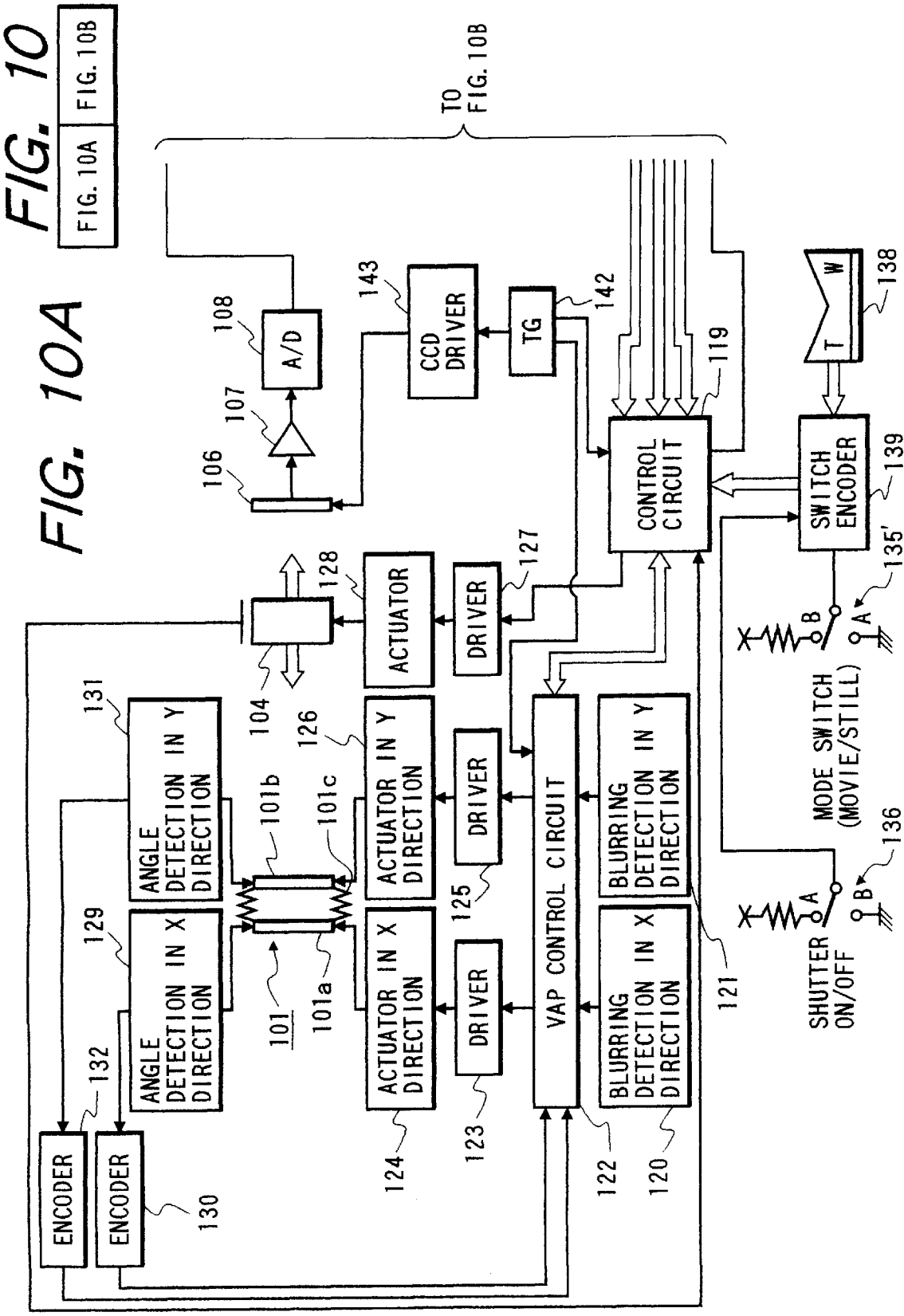

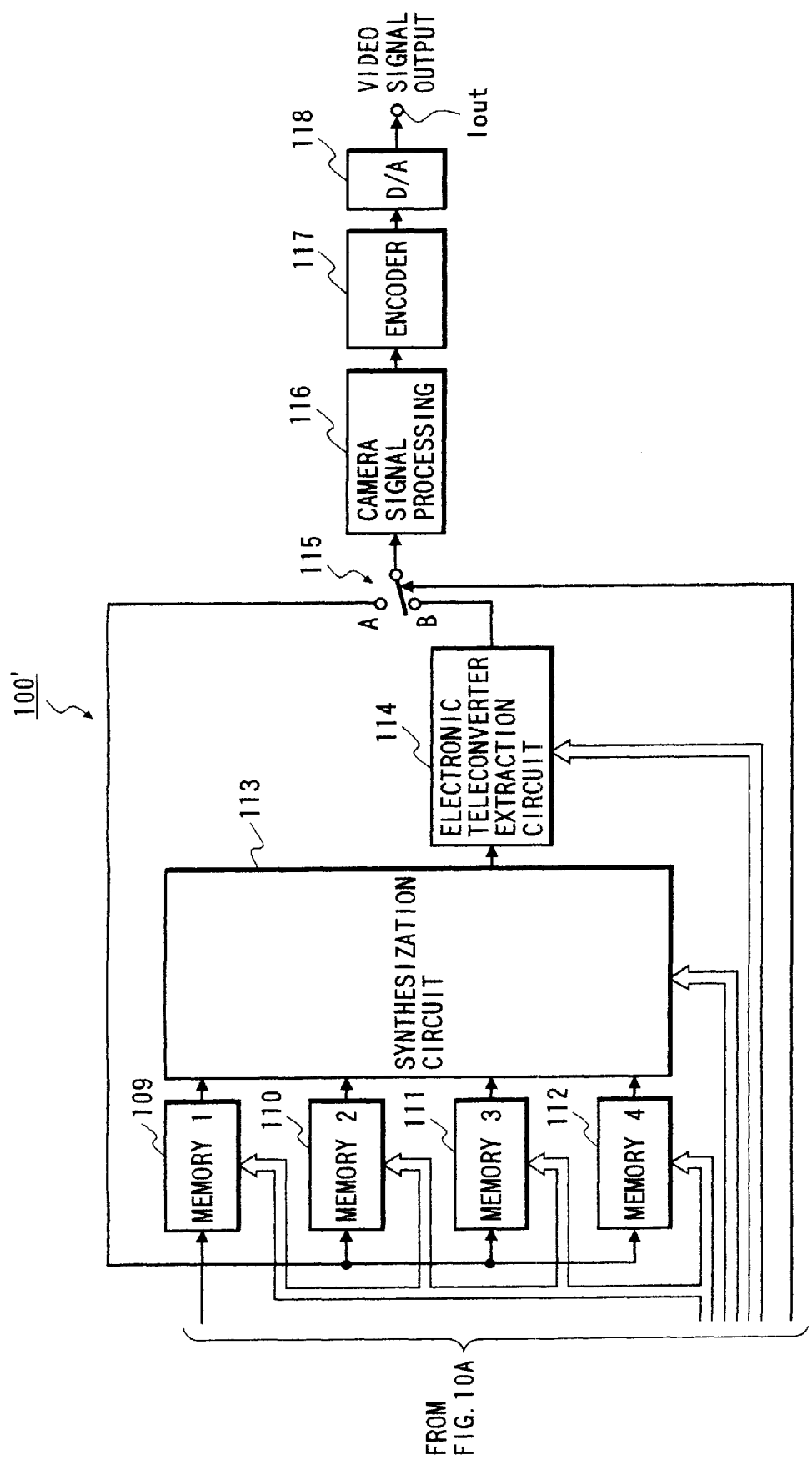

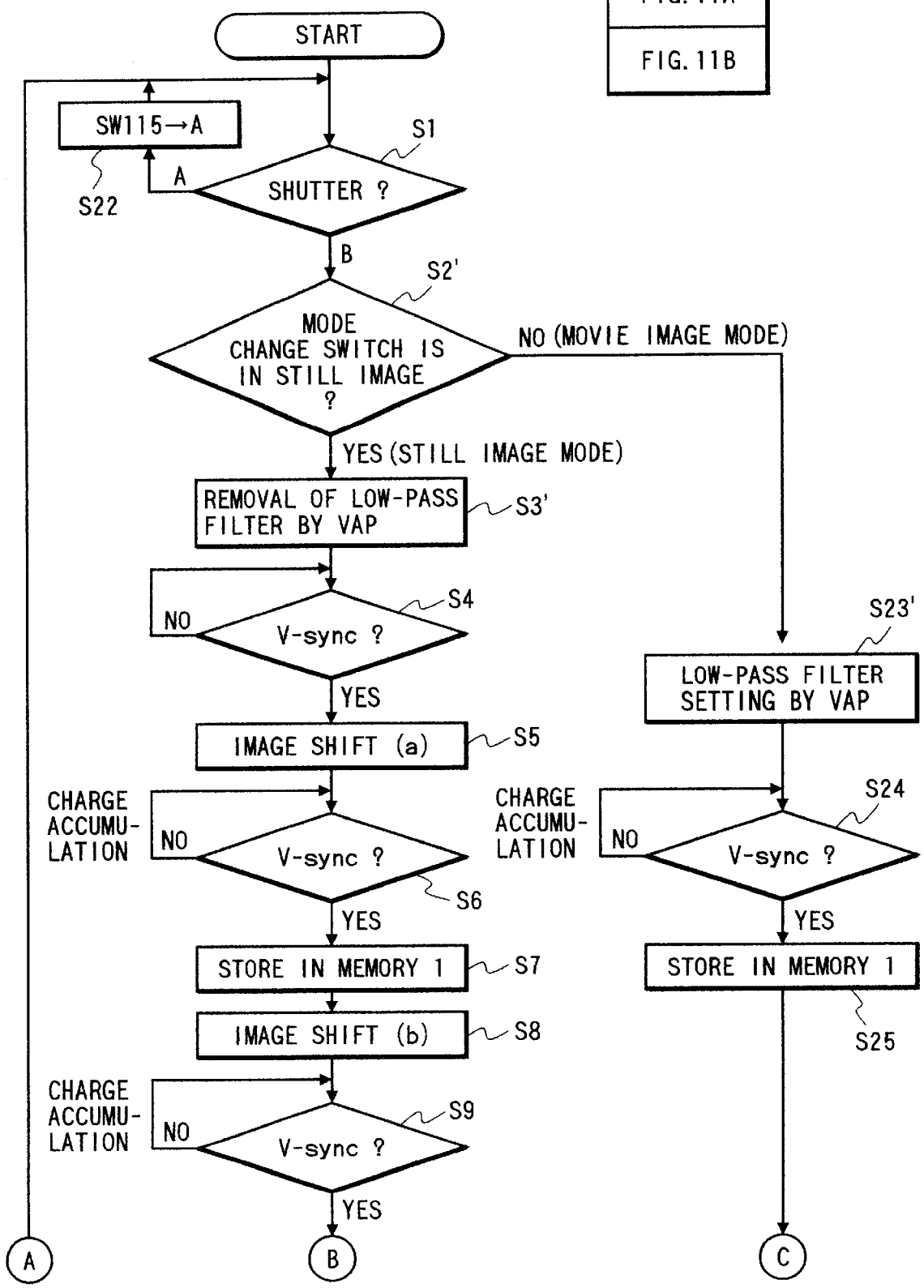

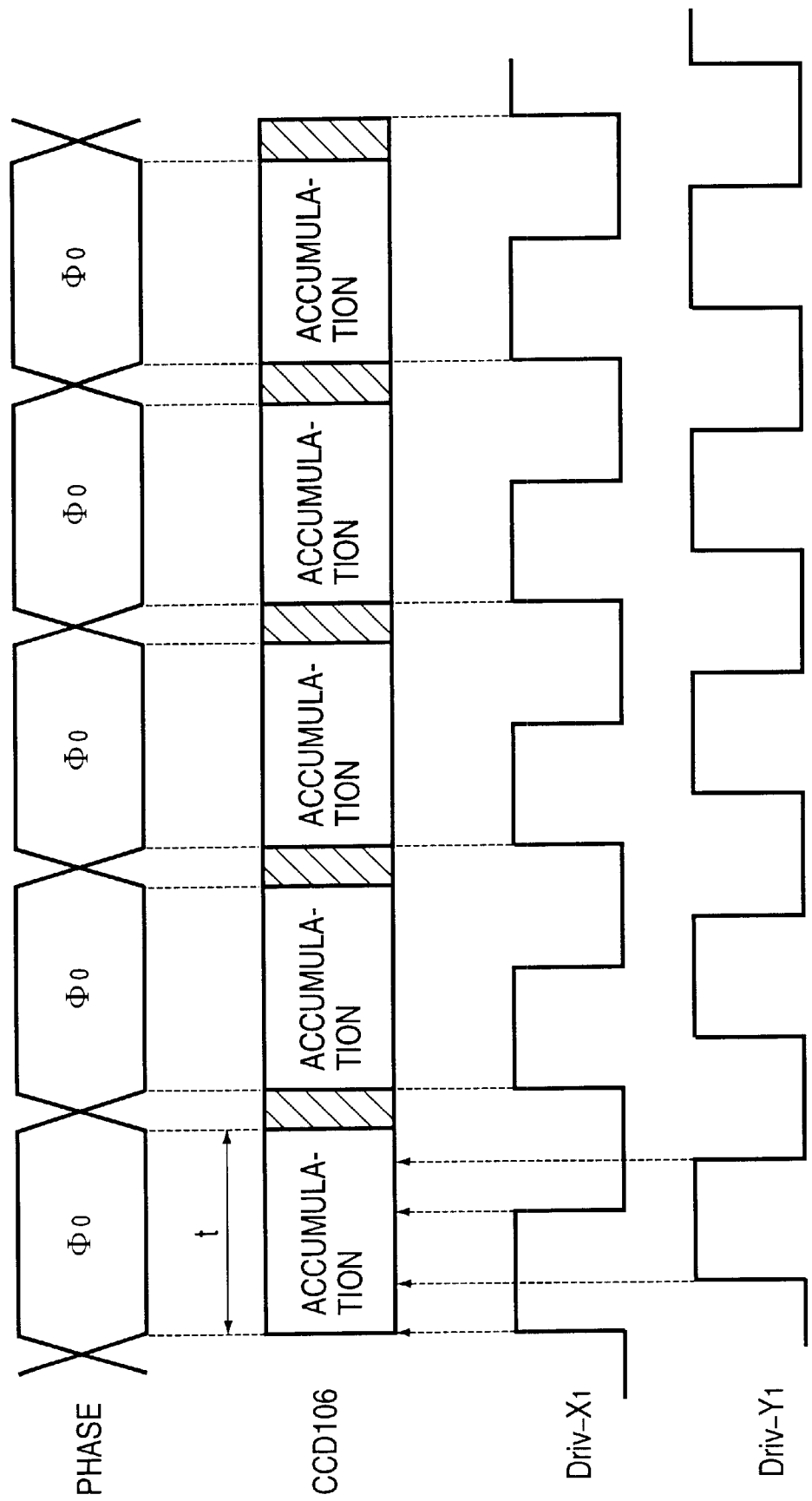

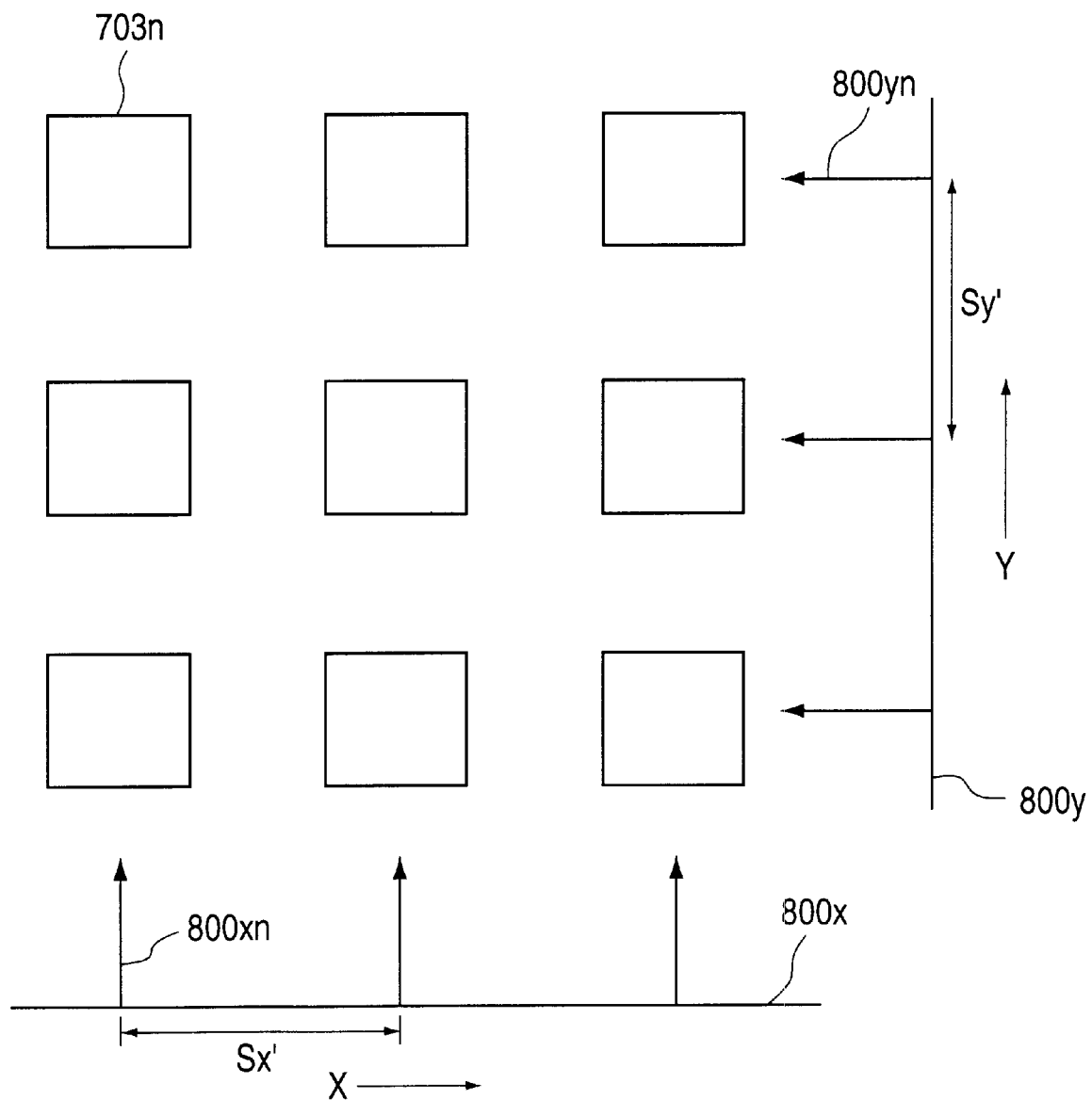

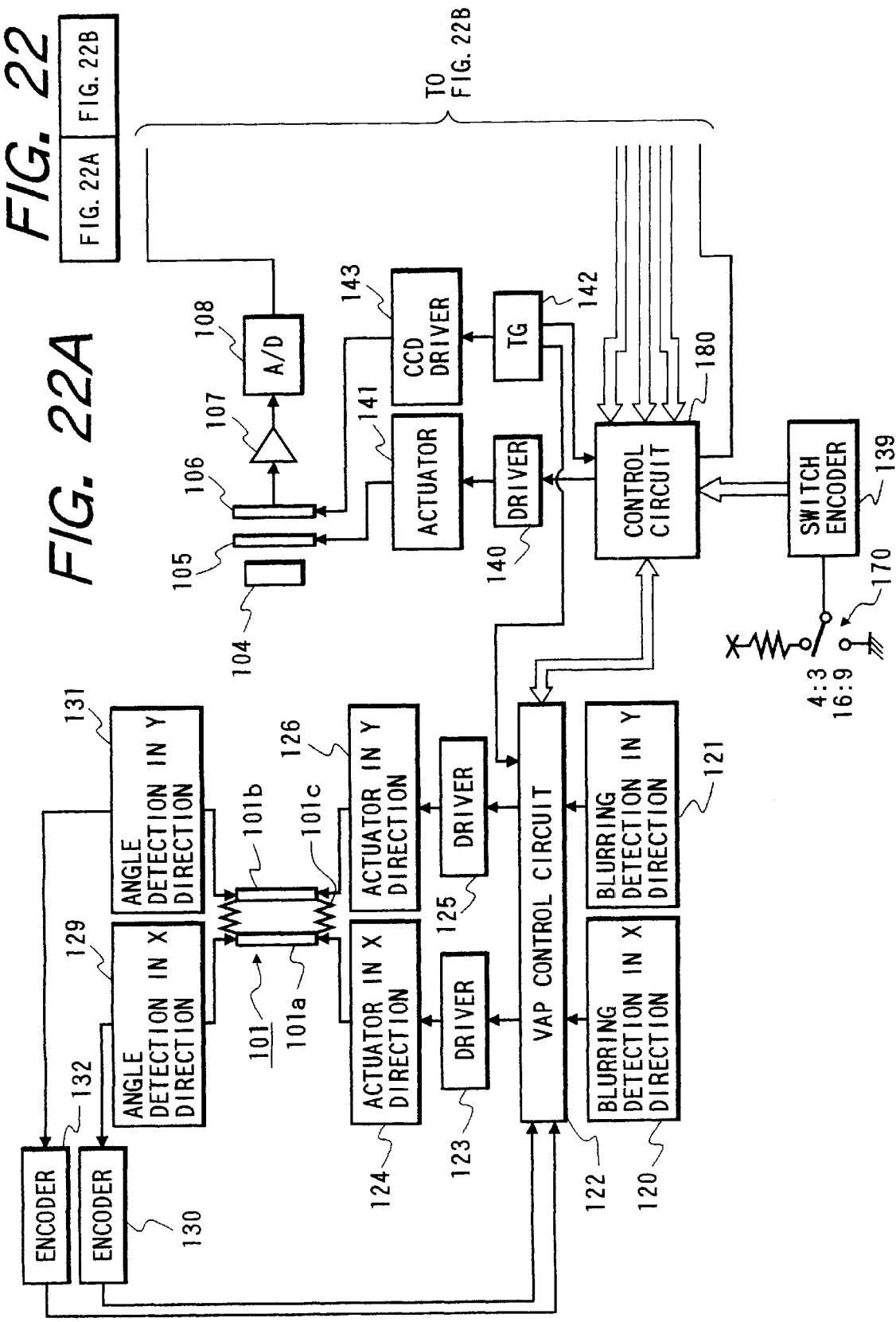

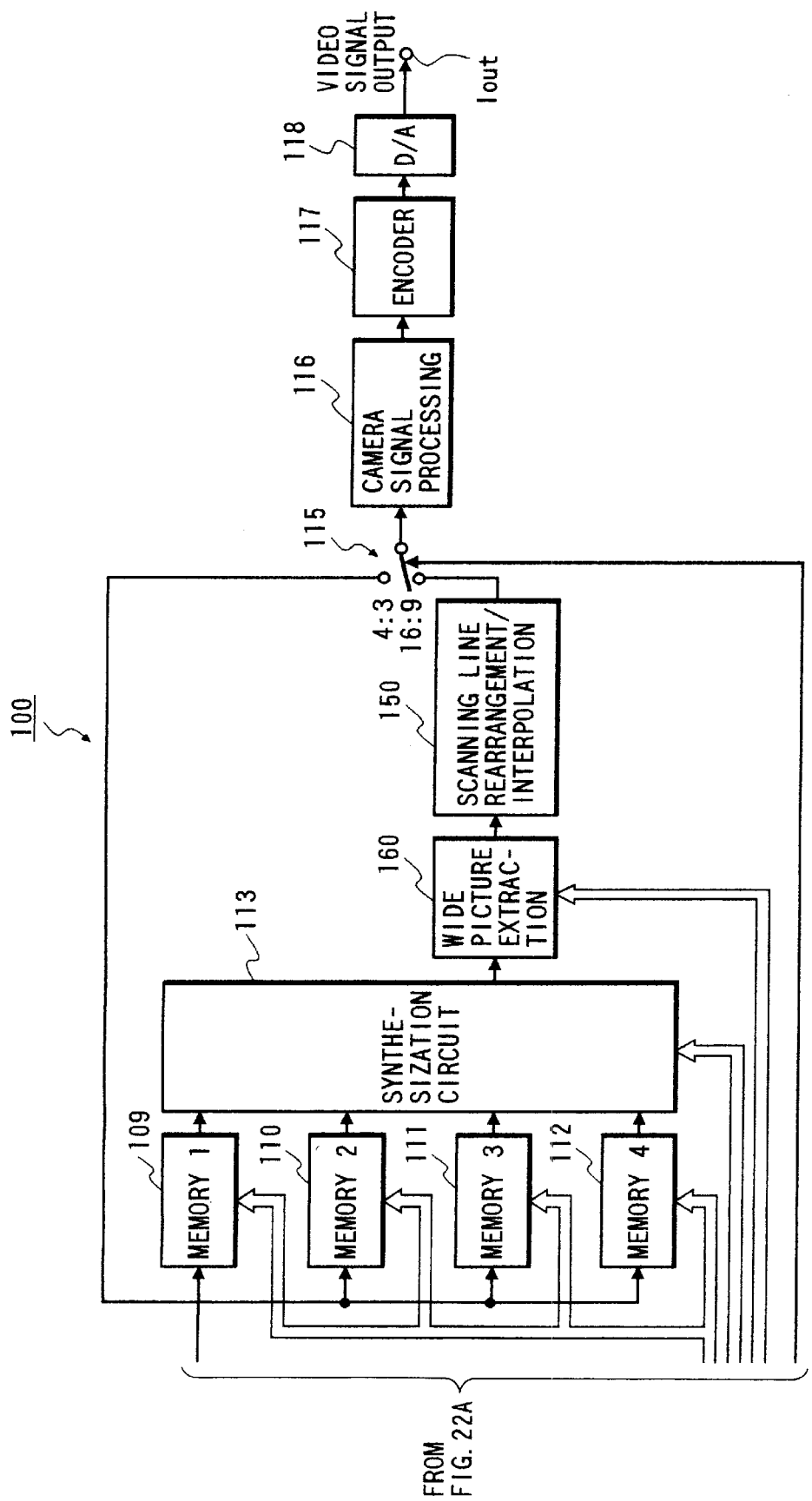

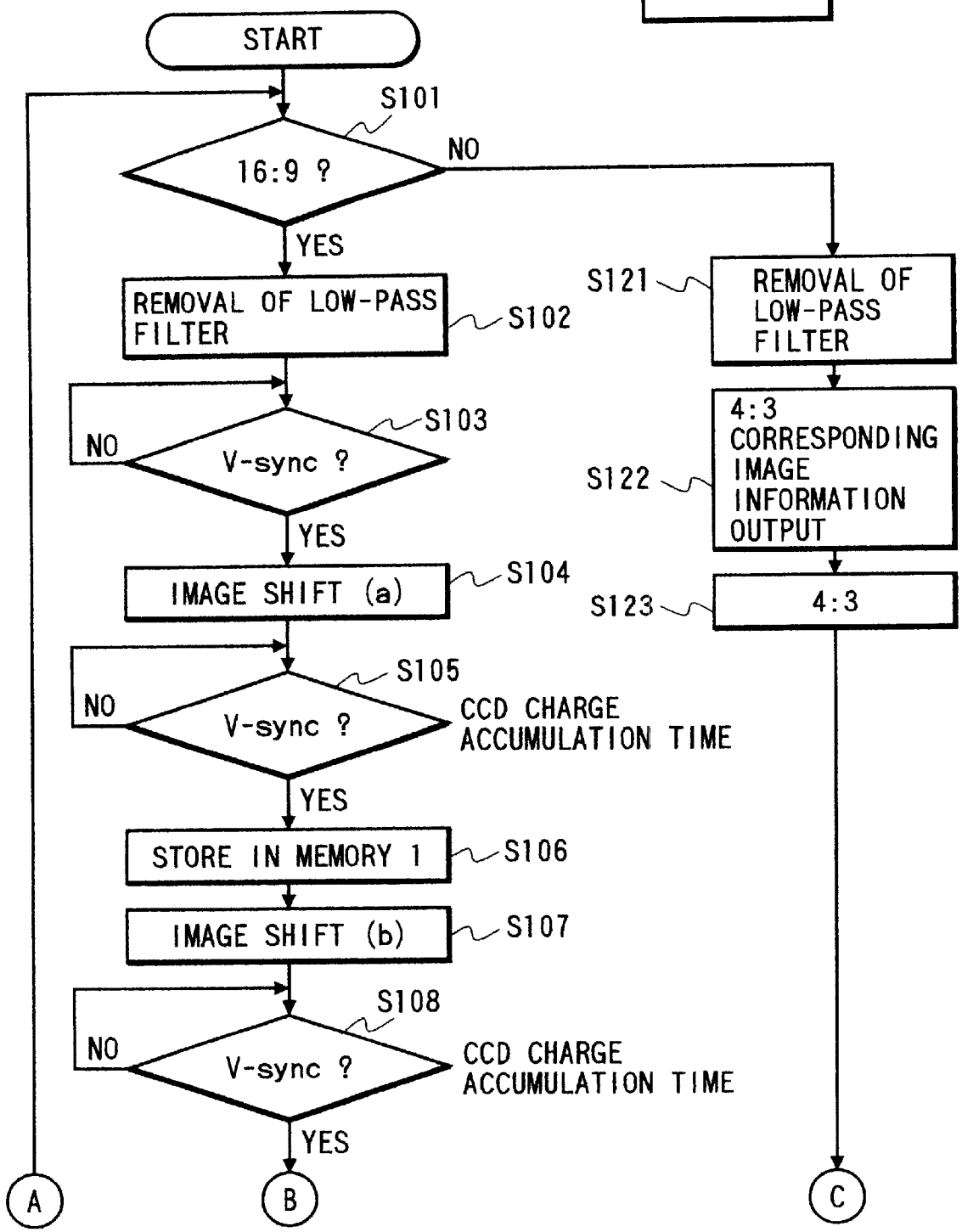

IMAGE PICKUP APPARATUS FOR APPLYING PREDETERMINED SIGNAL PROCESSING IN CONJUNCTION WITH AN IMAGE SHIFTING MECHANISM

BACKGROUND OF THE INVENTION

1. Field of the Invention

The present invention relates to an image processing apparatus for applying a predetermined signal processing to the image taken in the form of electrical signals, and an image pickup apparatus utilizing such image processing apparatus, and more particularly an image processing apparatus having a function of enlarging a taken image, and an image pickup apparatus employing such the image processing apparatus.

2. Related Background Art

With the recent development of the digital image processing technology for digitizing and processing the electrical image information obtained with an image pickup device, the function called "electronic zooming" or "electronic teleconverter" is widely adopted in the video cameras or the like for the consumer use.

As an example, FIG. 1 shows a video camera 700 provided with the electronic teleconverter function.

In this video camera 700, the electronic teleconverter function is turned on and off by shifting an electronic teleconverter switch 710 to a terminal A or B.

At first there will be explained the operation of the video camera 700, which is performed when the electronic teleconverter function is turned off by placing the electronic teleconverter switch 710 at the terminal A.

In this state, a switch 706 is switched to a terminal A under the control of a control circuit 714.

The image of an unrepresented object is transmitted through unrepresented plural optical lenses, a zoom lens 701 provided coaxially therewith and an optical low-pass filter 702, and is focused on the image-pickup surface of a CCD (charge-coupled device) 703, thereby being converted (hereinafter called photoelectric conversion) into an electrical image signal.

The image signal obtained in the CCD 703 is supplied, through an amplifier circuit 704, to an analog/digital (A/D) converter 705.

The A/D converter 705 digitizes the image signal, supplied through the amplifier circuit 704, into digital image data, which are supplied to a terminal A of the switch 706.

Since the switch 706 is shifted to the terminal A in this state, as explained above, the image data obtained in the A/D converter 705 are supplied from the switch 706 to a camera signal processing circuit 707.

The camera signal processing circuit 707 applies a predetermined signal processing to the image data from the switch 706, and supplies an encoder 708 with thus processed image data.

The encoder 708 applies a modulation according to a predetermined television format to the image data supplied from the camera signal processing circuit 707, and supplies a digital/analog (D/A) converter 709 with thus modulated image data.

The D/A converter 709 converts the image data from the encoder 708 into an analog television signal (image signal) for output from an output terminal Iout.

FIG. 2 shows the arrangement of image taking pixels (hereinafter simply called pixels) on the image-pickup surface of the CCD 703, a distance 800x of the sampling points in the X-direction and a distance 800y of the sampling points in the Y-direction.

As shown in FIG. 2, the sampling point for a given pixel 703n is defined in the X- and Y-directions by 800xn and 800yn (indicated by arrows) and can be regarded as a single point for each pixel.

Since such arrangement of the pixels in the X- and Y-directions determines the upper limit of the spatial frequency of the image that can be picked up, the frequency characteristics of the above-mentioned optical low-pass filter 503 are determined according to the range of the spatial frequency of the picked-up image mentioned above.

Consequently the video camera 700 is provided with the optical low-pass filter 503 coaxially with the unrepresented plural optical lenses and is so designed as to cut off, by such optical low-pass filter 503, the high spatial frequencies which generate fold-back noises at the photoelectric conversion by the CCD 703.

Also the video camera 700 realizes the image enlarging function solely by the focal length determined by the zoom lens 701.

More specifically, the image angle of the analog television signal released by the D/A converter 709 is same as the image angle (hereinafter also called image size) of the image focused on the image-pickup surface of the CCD 703.

When an image magnification rate is designated by the manipulation of a zoom switch 712, the control circuit 714 supplies a driver 715 with a drive command based on the manipulation of the zoom switch 712.

The driver 715 drives an actuator 716 based on the drive command from the control circuit 714.

According to the driving of the actuator 716, the zoom lens 701 displaces parallel to the optical axis.

In this manner the above-mentioned focal length is determined, whereby obtained is an image of the magnification rate designated by the manipulation of the zoom switch 712.

In the following there will be explained the operation of the video camera 700, which is performed when the electronic teleconverter function is turned on by placing the electronic teleconverter switch 710 at the terminal B.

As in the above-explained case where the electronic teleconverter function is turned off, the image of an unrepresented object is transmitted through unrepresented plural optical lenses, the zoom lens 701, the optical low-pass filter 702, the CCD 703, the amplifier circuit 704 and the A/D converter 705 thereby being converted into image data, which are supplied to the terminal A of the switch 706.

The image data released from the A/D converter 705 are also supplied to an electronic teleconverter extracting circuit 715.

The electronic teleconverter extracting circuit 715 applies an image extracting process, to be explained later, to the image data from the A/D converter 705, and supplies the terminal B of the switch 706 with the image data subjected to such extracting process.

If the shutter is turned off in this state by shifting a shutter switch 711 to a terminal A, the switch 706 is also switched to the terminal A under the control of the control circuit 714.

Consequently the image data released from the A/D converter 705 are supplied to the camera signal processing circuit 707 through the switch 706.

In this case, the image data of an image size equal to that of the image focused on the image-pickup surface of the CCD 703 are supplied to the camera signal processing circuit 707, and are output from the output terminal Iout through the encoder 708 and the D/A converter 709.

On the other hand, if the shutter is turned on by switching the shutter switch 711 to the terminal B, the switch 706 is also switched to the terminal B under the control of the control circuit 714.

Consequently the extracted image data output from the electronic teleconverter extracting circuit 715 are supplied to the camera signal processing circuit 707.

Thus, in this case, while the shutter is turned on, the extracted image data obtained in the electronic teleconverter extracting circuit 715 are supplied to the camera signal processing circuit 707, and are output from the output terminal Iout through the encoder 708 and the D/A converter 709.

In the following there will be explained the extracting process of the above-mentioned electronic teleconverter extracting circuit 715.

As an example, in case the CCD 703 picks up image 901$d$ within a frame 901 shown in FIG. 3A, the image data based on such image 901$d$ are supplied to the electronic teleconverter extracting circuit 715.

The electronic teleconverter extracting circuit 715 extracts, from the supplied image data (image 901$d$), image data (image 902$d$) within a frame 902 of an area corresponding to ¼ of that of the frame 901 and enlarges thus extracted image data twice vertically and horizontally to obtain enlarged image data (image 902$d'$) as shown in FIG. 3B.

Consequently, when the electronic teleconverter function is turned on and the shutter is also turned on, the camera signal processing circuit 707 receives, through the switch 706, such enlarged image data (image 902$d'$) as the extracted image data or the image data after the enlargement by the electronic teleconverter.

However, in such video camera 700, for obtaining the enlarged image data (image 902$d'$) as shown in FIG. 3B by the electronic teleconverter extracting circuit 715, there is required a process in which the pixel information, in the vertical direction (X-direction), of the image 902$d$ shown in FIG. 3A, reduced to ½ by extraction, is rearranged in the vertical direction with a pitch equal to twice of that of the pixel information prior to extraction, and that the pixel information in the horizontal (Y) direction, reduced to ½ by extraction, is rearranged in the horizontal direction with a pitch equal to twice of that of the pixel information prior to extraction.

In this operation, as the gap of the neighboring pixels is doubled in comparison with that prior to enlargement, there is also required an interpolation process of interpolating the gap with the average value of the two neighboring pixel information.

Since the pixel information of the image 902$d$ prior to the enlargement by the electronic teleconverter function is used to generate the image 902$d'$ of a size which basically requires a quadrupled amount of pixel information, the image 902$d'$ becomes inevitably coarse in resolution, because of the limited amount of pixel information, even despite of the interpolating operation mentioned above.

SUMMARY OF THE INVENTION

In consideration of the foregoing, a first object of the present invention is to provide an image processing apparatus and an image pickup apparatus, capable of an enlarged image of high image quality, even in case a part of the image is extracted and enlarged.

A second object of the present invention is to improve the image quality at the image enlargement, by utilizing the pixel displacement technology.

The above-mentioned objects can be attained, according to a preferred embodiment of the present invention, by an image processing apparatus comprising photoelectric conversion means for converting an optical object image, focused on an image-pickup surface thereof, into an electrical image signal; a relative position displacement means for displacing the relative position of the object image focused on the image-pickup surface and the image-pickup surface by a predetermined amount; plural memory means for storing the image signal obtained by the photoelectric conversion means at each displacement executed by the relative position displacement means; a synthesis means for synthesizing the image signals stored in the plural memory means; extraction means for extracting a partial image from the synthesized image signal obtained by the synthesis means, thereby generating an extracted image signal; and enlargement means for enlarging the extracted image signal, generated in the extraction means, thereby generating an enlarged image signal.

A third object of the present invention is to provide an image processing apparatus capable of constantly providing highest image quality both in a moving image processing mode and in a still image processing mode.

The above-mentioned object can be attained, according to a preferred embodiment of the present invention, by an image processing apparatus capable of selectively setting a moving image processing mode and a still image processing mode, comprising photoelectric conversion means for converting an optical object image, focused on an image-pickup surface thereof, into an electrical image signal; a relative position displacement means for displacing the relative position of the object image focused on the image-pickup surface and the image-pickup surface by a predetermined amount; plural memory means for storing the image signal obtained by the photoelectric conversion means at each displacement executed by the relative position displacement means; synthesis means for synthesizing the image signals stored in the plural memory means; extraction means for extracting a partial image from the synthesized image signal obtained by the synthesis means, thereby generating an extracted image signal; and enlargement means for enlarging the extracted image signal, generated in the extraction means, thereby generating an enlarged image signal, wherein the cycle period of displacement in the relative position displacement means is set according to the selected image processing mode.

A fourth object of the present invention is to provide an image pickup apparatus capable of reading plural high-quality images having different aspect ratios of the image area.

A fifth object of the present invention is to provide an image processing apparatus in which the optical low-pass filter is constituted by a pixel displacement system.

A sixth object of the present invention is to provide an image pickup apparatus capable of enlargement, reduction and a change in the aspect ratio of the image without deterioration in the image quality.

A seventh object of the present invention is to optimize a blur correction circuit, an optical low-pass filter etc. according to the selection between a moving image taking mode and a still image taking mode.

Still other objects of the present invention, and the features thereof, will become fully apparent from the following description which is to be taken in conjunction with the attached drawings.

BRIEF DESCRIPTION OF THE DRAWINGS

FIG. 4, which is comprised of FIGS. 4A and 4B, is block diagram showing the configuration of a video camera in which applied is an image processing apparatus constituting a first embodiment of the present invention;

FIGS. 6A, 6B, 6C and 6D are views showing the process of signal charge accumulation by a shift of the relative position of the image and the photosensor element;

FIG. 10, which is comprised of FIGS. 10A and 10B, is block diagram showing the configuration of a video camera in which applied is the image processing apparatus constituting a second embodiment of the present invention;

FIG. 12 is a view showing the shift sequence when the moving image taking mode is selected;

FIG. 19 is a view showing the arrangement of the photosensor elements in the CCD of the above-mentioned video camera;

FIG. 22, which is comprised of FIGS. 22A and 22B, is block diagram showing the configuration of a video camera in which applied are the image pickup apparatus and the image processing apparatus constituting a second embodiment of the present invention.

DETAILED DESCRIPTION OF THE PREFERRED EMBODIMENTS

Figure 1:
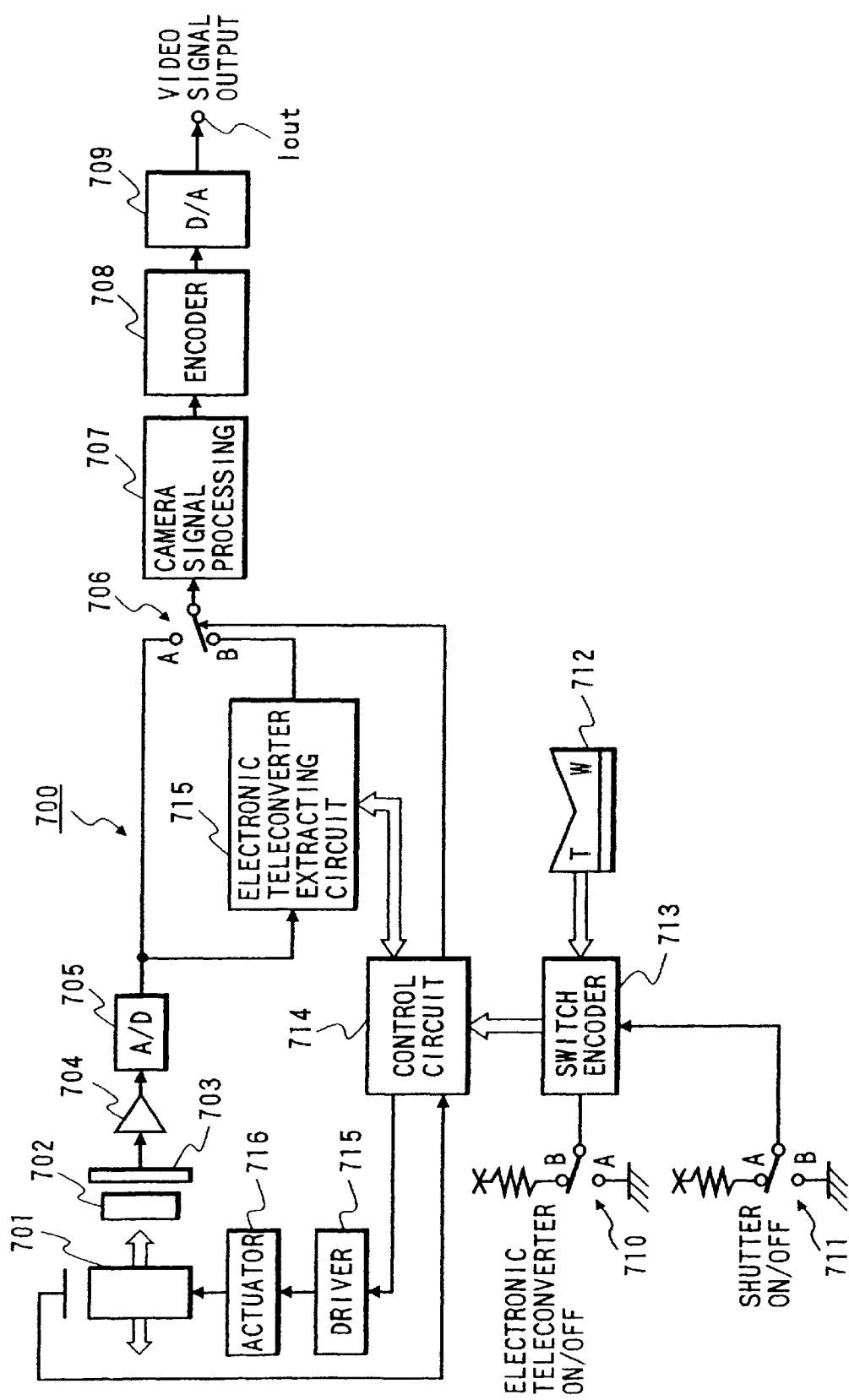
FIG. 1 is a block diagram showing the configuration of a conventional video camera provided with an electronic teleconverter function.
Figure 2:
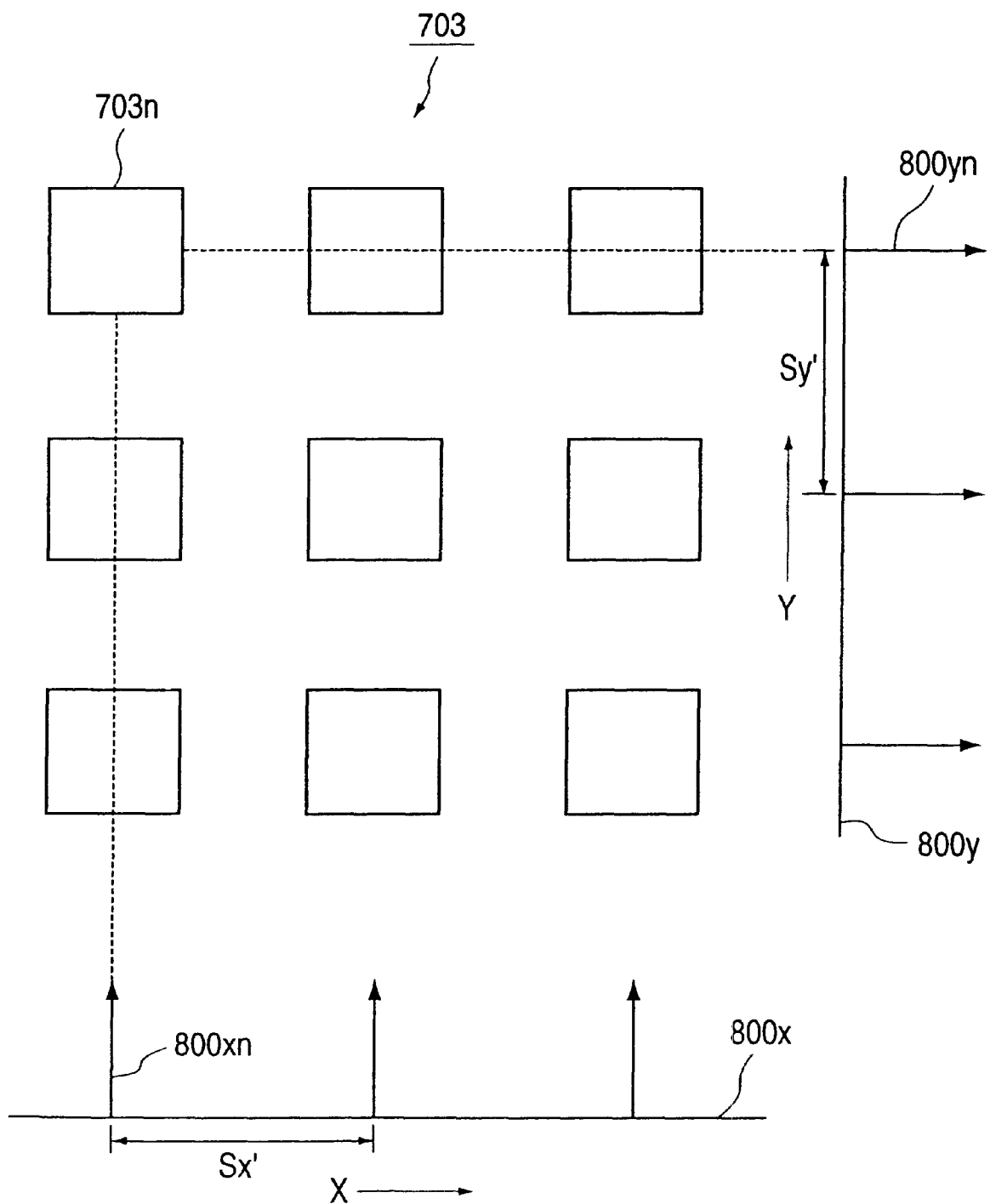
FIG. 2 is a view showing the arrangement of photosensor elements in a CCD employed in the above-mentioned video camera.

Now the present invention will be clarified in detail by embodiments thereof, with reference to the attached drawings.

The image processing apparatus of the present invention is applicable, for example, to a video camera 100 as shown in FIGS. 4A and 4B.

The video camera 100 has an electronic teleconverter function, and is provided, as shown in FIGS. 4A and 4B, with a variable angle prism (VAP) 101 receiving the light from an object; a zoom lens 104, an optical low-pass filter 105 and a CCD 106 provided in succession on the optical axis of the VAP 101; an amplifier circuit 107 receiving the output of the CCD 106; an A/D converter 108 receiving the output of the amplifier circuit 107; four memories 109–112 respectively receiving the output of the A/D converter 108; a synthesis circuit 113 receiving the outputs of the memories 109–112; an electronic teleconverter extracting circuit 114 receiving the output of the synthesis circuit 113; a switch 115 receiving the outputs of the A/D converter 108 and of the electronic teleconverter extracting circuit 114; a camera signal processing circuit 116 receiving the output of the switch 115; an encoder 117 receiving the output of the camera signal processing circuit 116; and a D/A converter 118 receiving the output of the encoder 117, wherein the output of the D/A converter 118 is output through an output terminal Iout.

The video camera 100 is further provided with an X-direction blur detection circuit 120; a Y-direction blur detection circuit 121; a VAP control circuit 122 receiving the outputs of the X-direction blur detection circuit 120 and the Y-direction blur detection circuit 121; drivers 123, 125 receiving the output of the VAP control circuit 122; an X-direction actuator 124 receiving the-output of the driver 123; and a Y-direction actuator 126 receiving the output of the driver 125, wherein the outputs of the X- and Y-direction actuators 124, 126 are supplied to the VAP 101.

The video camera 100 is further provided with an X-direction angle detection circuit 131; a Y-direction angle detection circuit 129; an encoder 132 receiving the output of the X-direction angle detection circuit 131; and an encoder 130 receiving the output of the Y-direction angle detection circuit 129, wherein the outputs of the X- and Y-direction angle detection circuits 131, 129 are also supplied to the VAP 101 while the outputs of the encoders 132, 130 are supplied to the VAP control circuit 122.

The video camera 100 is further provided with a driver 127; an actuator 128 receiving the output of the driver 127; a driver 140; an actuator 141 receiving the output of the driver 140; a timing generator (TG) 142; and a CCD driver 143 receiving the output of the TG 142, wherein the output of the actuator 128 is supplied to the zoom lens, while the output of the actuator 141 is supplied to the optical low-pass filter, and the output of the CCD driver 143 is supplied to the CCD 106.

The output of the TG 142 is supplied also to the VAP control circuit 122.

The video camera 100 is further provided with a switch encoder 139 receiving the outputs of a shutter switch 136, an electronic teleconverter switch 135 and a zoom switch 138; and a control circuit 119 receiving the output of the switch encoder 139, wherein the control circuit 119 also receives the outputs of the zoom lens 104 and the TG 142.

The control circuit 119 controls various units of the apparatus, including the VAP control circuit 122, the drivers 127, 140, the memories 109–112, the synthesis circuit 113, the electronic teleconverter extracting circuit 114 and the switch 115, based on the output of the switch encoder 139, the zoom lens 104 and the TG 142.

In the following there will be explained the operations of the above-explained video camera 100.

The VAP 101 is composed of mutually opposed two flat glass plates 101a, 101b, and bellows 101c so provided as to mutually connect the two flat glass plates 110a, 101b, and a space defined by the flat glass plates 110a, 101b and the bellows 101c formed by polyethylene for example is filled with transparent liquid such as silicone oil.

The flat glass plate 101a is rendered rotatable in the X-direction of the object image to be taken, while the flat glass plate 101b is rendered rotatable in the Y-direction of the object image to be picked up.

In such VAP 101, the angle of the incident light to the VAP 101 is equal to that of the emerging light from the VAP 101 when the two flat glass plates 101a, 101b are mutually parallel, but the incident light is refracted in the VAP 101 if the two flat glass plates 101a, 101b are not mutually parallel.

The X-direction blur detection circuit 120 is composed for example of a piezoelectric vibration gyro, in which a detecting piezoelectric element adhered to a resonant vibration member is driven by the resonant frequency of the resonant vibration member and the Colliori's force is detected by the output of the piezoelectric element, and releases the output of the piezoelectric vibration gyro as the amount of hand vibration in the X-direction.

The Y-direction blur detection circuit 121 is constructed similarly to the X-direction blur detection circuit 120, and outputs the amount of hand vibration in the Y-direction in a similar manner as in the X-direction blur detection circuit 120.

The VAP control circuit 122 provides the drivers 123, 125 with drive commands, under the control of the control circuit 119 and based on the hand vibration amounts in the X- and Y-directions output from the X- and Y-direction blur detection circuits 120, 121.

Such drive command includes, as will be explained later in more details, for example information for correcting the hand vibration and information for "pixel shift" when the electronic teleconverter function is turned on.

The drivers 123, 125 respectively drive the X- and Y-actuators 124, 126 according to the drive commands from the VAP control circuit 122.

The flat glass plates 101a, 101b of the VAP 101 are respectively rotated by the drive of the X- and Y-actuators 124, 126.

The positions of the flat glass plates 101a, 101b constituting an optimum vertical angle, attained by the respective rotations thereof, will also be referred to as "target vertical angle position".

Also the rotation states of the flat glass plates 101a, 101b will be referred to as "vertical angle state".

The vertical angle states of the flat glass plates 101a, 101b are respectively detected by the Y- and X-angle detection circuit 129, 131, and are fed back to the VAP control circuit 122 through the encoders 130, 132.

The VAP control circuit 122 provides the drivers 123, 125 with the above-mentioned drive commands, based on the amounts of hand vibration in the X- and Y-directions released from the X- and Y-direction blur detection circuits 120, 121 and the vertical angle states of the flat glass plates 101a, 101b released from the encoders 130, 132.

Thus, by rotating the two flat glass plates 101a, 101b in the above-explained loop control, the incident light to the VAP 101 is refracted in a predetermined direction, and the light emerging from the VAP 101 is output through the zoom lens 104.

In this state, the driver 127 drives the actuator 128 under the control of the control circuit 119, whereby the zoom lens 104 is axially displaced and the focal length thereof is determined.

Also the driver 140 drives the actuator 141 under the control of the control circuit 119, whereby the optical low-pass filter 105 is inserted into or retracted from the optical path according to the on/off state of the electronic teleconverter function.

Also the TG 142 generates a vertical synchronization signal and supplies it to the control circuit 119, the VAP control circuit 122 and the CCD driver 143, and the CCD 106 is driven by the CCD driver 143 based on the vertical synchronization signal from the TG 142.

Consequently the light emerging from the zoom lens 104 is focused, either through the optical low-pass filter 105 or directly, on the image-pickup surface of the CCD 106, which effects photoelectric conversion and outputs electric image information, under the drive by the CCD driver 143.

The image information released from the CCD is transmitted through the amplifier circuit 107 and the A/D converter 108, and is supplied as image data to the terminal A of the switch 115 and is also stored in the memories 109–112 under the control of the control circuit 119.

The synthesis circuit 113 synthesizes, as will be explained later in more details, the image data stored in the memories 109–112 under the control of the control circuit 119 and sends the synthesized image data to the electronic teleconverter extracting circuit 114.

Figure 3A:
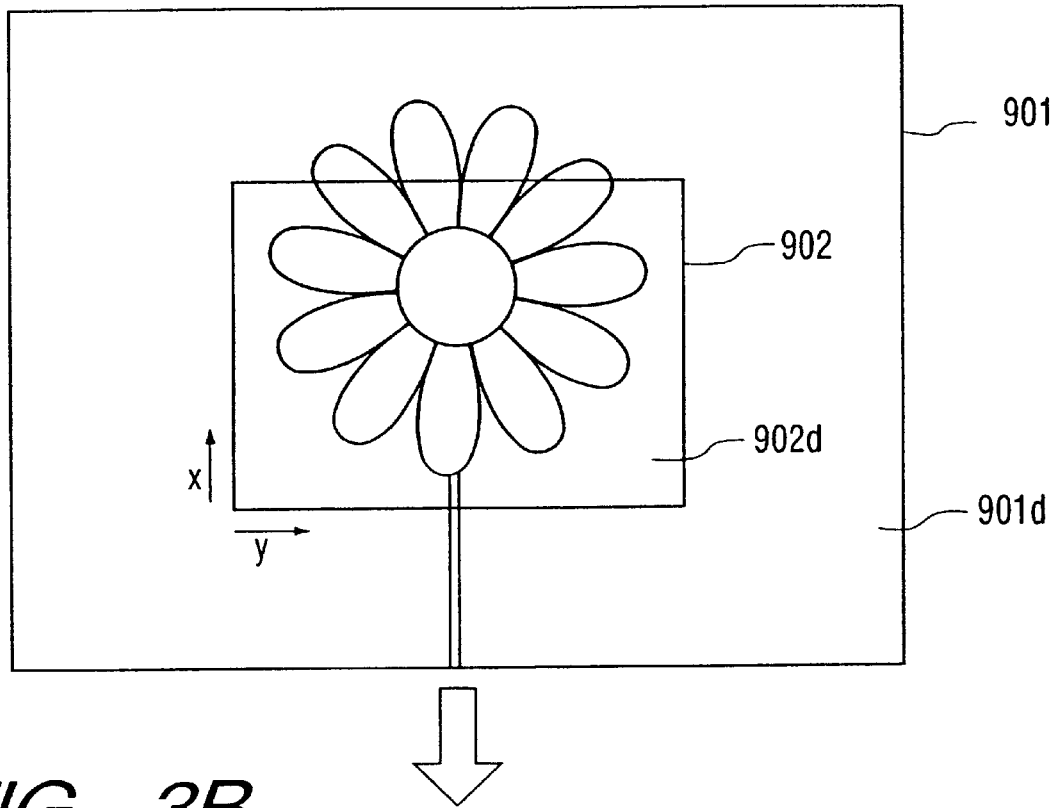
FIGS. 3A and 3B are views showing the image extracting process in the above-mentioned electronic teleconverter function.
Figure 3B:
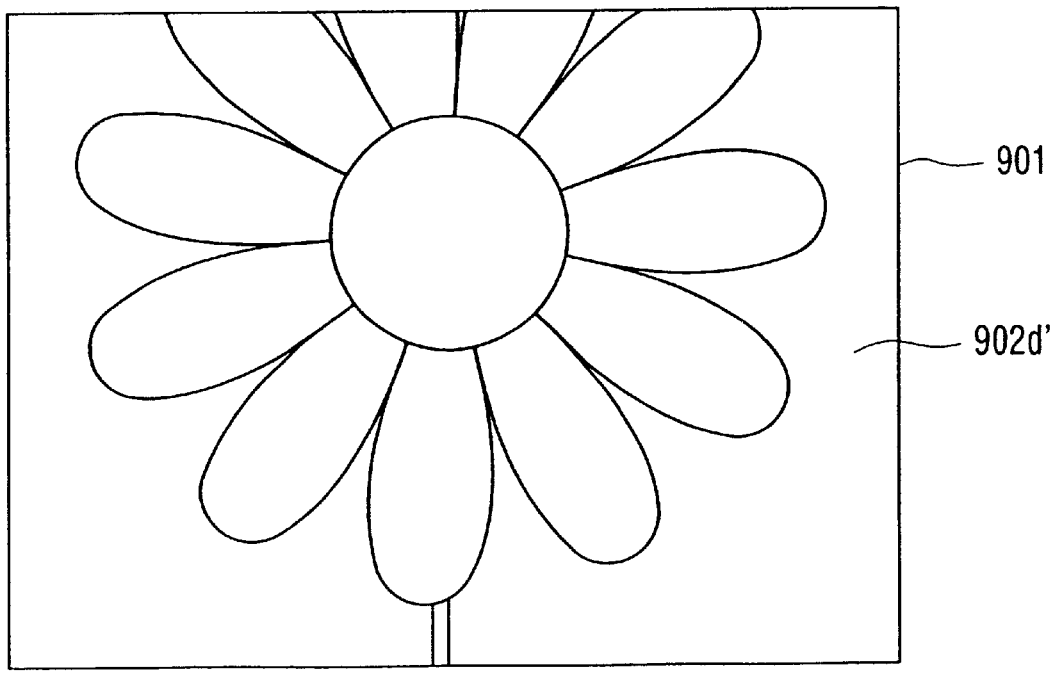

The electronic teleconverter extracting circuit 114 applies an image extracting process, as shown in FIGS. 3A and 3B, to the image data from the synthesis circuit 113 under the control of the control circuit 119, and sends the extracted image data, obtained by such extracting process, to the terminal B of the switch 115.

The switch 115 is shifted to the terminal A or B under the control of the control circuit 119, thereby supplying the camera signal processing circuit 116 with the image data from the A/D converter 108 or the extracted image data from the electronic teleconverter extracting circuit 114.

The camera signal processing circuit 116 applies a predetermined signal processing to the image data supplied from the switch 115, and sends thus processed image data to the encoder 117.

The encoder 117 applies a modulation to the image data from the camera signal processing circuit 116 according to a predetermined television system, and sends thus modulated image data to the D/A converter 118.

The D/A converter 118 converts the image data from the encoder 117 into an analog television signal (image signal) which is output through the output terminal Iout.

Consequently the output terminal Iout releases the image signal either based on the image data from the A/D converter 108 or based on the image data from the electronic teleconverter extracting circuit 114.

In the following there will be given a more detailed explanation on the electronic teleconverter function of the video camera 100.

In this video camera 100, the electronic teleconverter function is turned on or off by the electronic teleconverter switch 135.

When the electronic teleconverter function is turned on, the video camera 100 executes the enlargement of the image which is partially extracted from the image data obtained in the A/D converter 108, utilizing "pixel shift" which is a method for obtaining a high-definition image utilizing a solid-state image pickup device represented by CCD.

The video camera 100 achieved such "pixel shift" utilizing above-mentioned refraction of the incident light in the VAP 101.

Figure 5B:
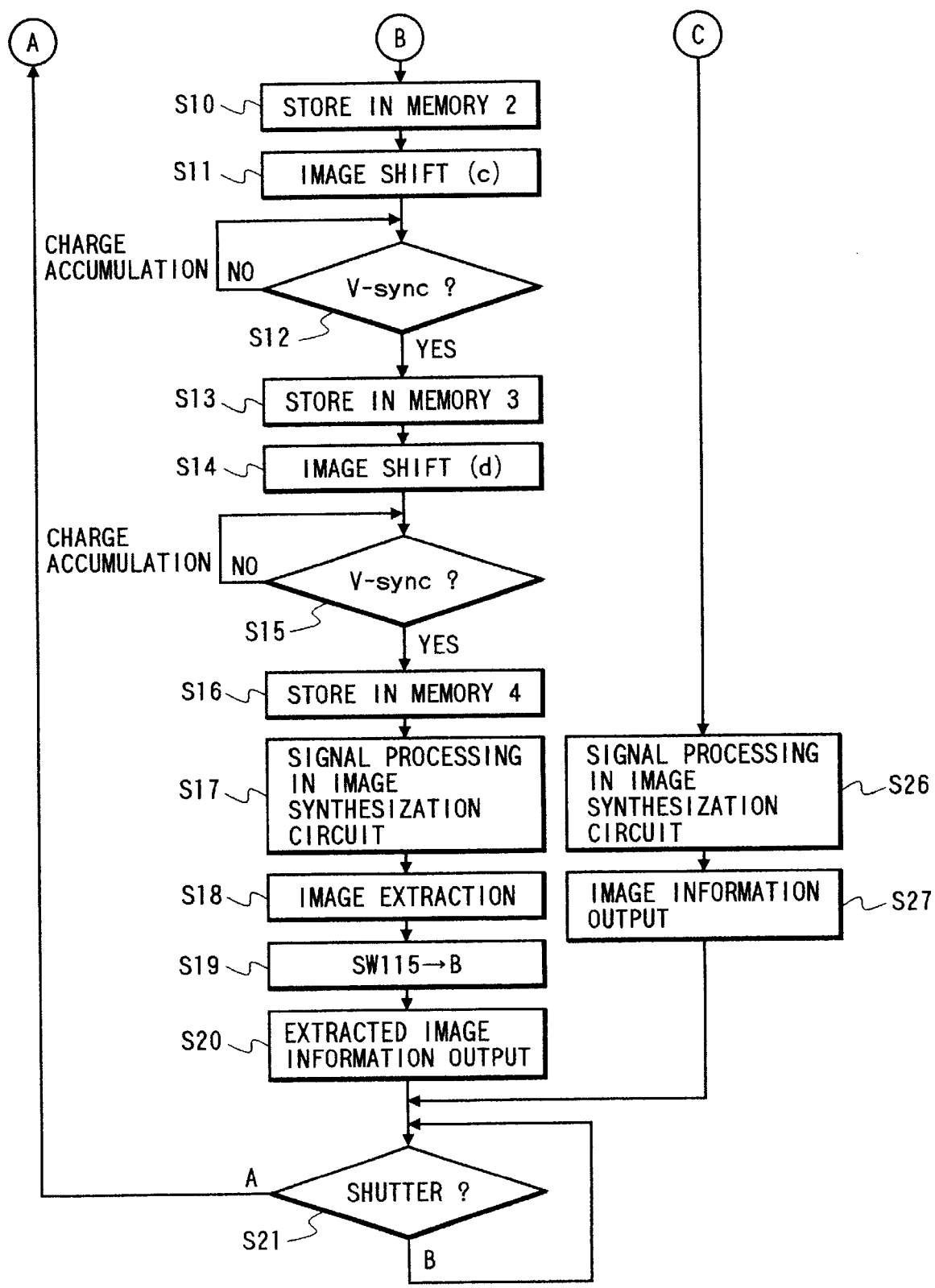
FIG. 5, which is comprised of FIGS. 5A and 5B, is flow chart showing the control sequence in a control circuit of the above-mentioned video camera.

FIGS. 5A and 5B are flow charts showing the control sequence of the control circuit 119.

In the following there will be explained, with reference to the flow charts in FIGS. 5A and 5B, the function of the video camera 100 when the electronic teleconverter function is turned on.

At first the switch encoder 139 detects the states of the shutter switch 135, the electronic teleconverter switch 134 and the zoom switch 136 and stores the results of such detection in the control circuit 119.

Based on the results of detection of the switch encoder 139, the control circuit 119 discriminates whether the shutter switch 136 is switched to the terminal A or B (step S1).

If the step S1 identifies that the shutter switch 136 is switched to the terminal A, namely the shutter being turned off and the still image taking being not intended, the control circuit 119 controls the switch 115 so as to switch it to the terminal A (step S22) and the sequence returns to the step S1.

Thus, in this case, the image data output from the A/D converter 108, corresponding to the size of the image picked up by the CCD 106, are supplied to the camera signal processing circuit 116.

On the other hand, if the step S1 identifies that the shutter switch 136 is switched to the terminal B, namely the shutter being turned on, the control circuit 119 discriminates, based on the result of detection by the switch encoder 139, whether the electronic teleconverter switch 135 is switched to the terminal A or B (step S2).

If the step S2 identifies that the electronic teleconverter switch 135 is switched to the terminal A, namely the electronic teleconverter function being turned off, the control circuit 119 supplies the driver 140 with such a drive command as to insert the optical low-pass filter 105 into the optical path.

In response to the drive command from the control circuit 119, the driver 140 controls the actuator 141, whereby the optical low-pass filter 105 is inserted into the optical path (step S23).

Consequently, in this case, the light emerging from the zoom lens 104 is subjected to the elimination of high spatial frequency components by transmission through the optical low-pass filter 105, so that the generation of fold-back noise can be prevented at the photoelectric conversion in the CCD 106.

In this case, the finally resulting image signal is not of a high-definition image, but the optical low-pass filter 105 is inserted into the optical path in order to prevent the generation of fold-back noise at the photoelectric conversion in the CCD 106.

After the above-explained process of the step S23, in response to the vertical synchronization signal output from the TG 142, the control circuit 119 enters a waiting state for a vertical synchronization signal period.

During this period, the CCD 106 is driven according to the vertical synchronization signal released from the CCD driver 143 under the control of the TG 142, thereby effecting photoelectric conversion on the received light to accumulate signal charges and outputting thus accumulated signal charges in succession. The signal charges thus released from the CCD 106 are output as the image data, through the amplifier circuit 107 and the A/D converter 108.

The control circuit 119, upon detecting the release of a next vertical synchronization signal from the TG 142 (step S24), stores the image data from the A/D converter 108 in the memory 109, as still image data (step S25).

Then the control circuit 119 supplies the synthesis circuit 113 with a control signal, instructing the output of the image data stored in the memory 109 without change.

In response the synthesis circuit 113 sends the still image data, stored in the memory 109, without change, to the terminal B of the switch 115 through the electronic teleconverter extracting circuit 114 (step S26).

In this state the switch 115 is shifted to the terminal B under the control of the control circuit 119 as explained before, so that the switch 115 outputs the image data stored in the memory 109, without change.

These image data are transmitted through the camera signal processing circuit 116, the encoder 117 and the D/A converter 118 in succession and output from the output terminal Iout as the still image signal (step S27).

Then, after the process of the step S27, the control circuit 119 discriminates, based on the result of detection by the switch encoder 139, whether the shutter switch 136 has been switched to the terminal A or B, then enters a waiting state until the shutter switch 136 is switched to the terminal A, namely until the shutter is turned off, and, when the shutter is turned off, the sequence returns to the step S1 explained before (step S21).

On the other hand, the aforementioned discrimination of the step S2 identifies that the electronic teleconverter switch 135 is switched to the terminal B, namely the electronic teleconverter function being turned on, the control circuit 119 supplies the driver 140 with such a drive command as to retract the optical low-pass filter from the optical path.

The driver 140 drives the actuator 141 according to the drive command from the control circuit 119, whereby the optical low-pass filter 105 is retracted from the optical path (step S3).

In this case, therefore, the light emerging from the zoom lens 104 is focused directly on the image-pickup surface of the CCD 106, without passing through the optical low-pass filter 105.

In this situation the optical low-pass filter 105 is retracted from the optical path, in order to generate a high-definition image by even fetching the light of a frequency higher than the cut-off frequency of the optical low-pass filter 105, by means of the "pixel shift".

After such process of the step S3, the control circuit 119 enters a waiting state until the output of the vertical synchronization signal from the TG 142, in order to measure the timing for the "pixel shift" (step S4).

Then, upon detecting the release of the vertical synchronization signal from the TG 142, the control circuit 119 causes the CCD 106 to effect "pixel shift" as shown in FIG.

6A by moving the pixel position from 201 to 201a relative to the image, and supplies the VAP control circuit 122 with such a control signal as to accumulate the signal charges in thus moved position.

According to such control signal, the VAP control circuit 122 controls the drivers 123, 125 to drive the X- and Y-actuators 124, 126 whereby the incident light to the VAP 101 is refracted.

Consequently the CCD 106 accumulates the signal charges obtained in a state where the relative position of the image and the pixels is shifted as shown in FIG. 6A (step S5).

The process of the step S5 is executed in a period after the output of the signal charges from the CCD 106 and before the re-start of accumulation of the signal charges.

The function of the VAP control circuit 122 will be explained later in more details.

Then the control circuit 119 enters a waiting state during a vertical synchronization period based on the vertical synchronization signal output from the TG 142, as in the aforementioned steps S24 and S25, in order to accumulate, in the CCD 106, the signal charges corresponding to the pixel information after the shift, and, upon detecting the output of the next vertical synchronization signal (step S6), stores the image data obtained by the CCD 106 in a state shown in FIG. 6A in the memory 109 (step S7).

Then the control circuit 119 causes the CCD 106 to shift the pixel position relative to the image from 202 to 202a as shown in FIG. 6B, and supplies the VAP control circuit 122 with a control signal for accumulating the signal charges obtained in such shifted position.

In response to the control signal, the VAP control circuit 122 controls the drivers 123, 125 to drive the X- and Y-actuators 124, 126 whereby the incident light to the VAP 101 is refracted.

Consequently the CCD 106 accumulates the image data obtained in a state where the pixels are shifted relative to the image as shown in FIG. 6B (step S8).

The process of the steps S7 and S8 is executed in period after the output of the signal charges from he CCD 106 and before the re-start of accumulation of the signal charges.

The control circuit 119 thereafter controls the VAP control circuit 122 in a similar manner as in the aforementioned steps S5–S8, based on the vertical synchronization signal output from the TG 142, thereby storing the image data obtained in a state shown in FIG. 6B in the memory 110 (steps S9 and S10), also storing the image data obtained in a state shown in FIG. 6C in the memory 111 (steps S11 to S13), and storing the image data obtained in a state shown in FIG. 6D in the memory 112 (steps S14 to S16).

Through the above-explained steps S4 to S16, the memories 109–112 store the image data respectively obtained in the states shown in FIGS. 6A to 6D.

Then the control circuit 119 so controls the synthesis circuit 113 as to execute the following process (step S17).

Figure 7:
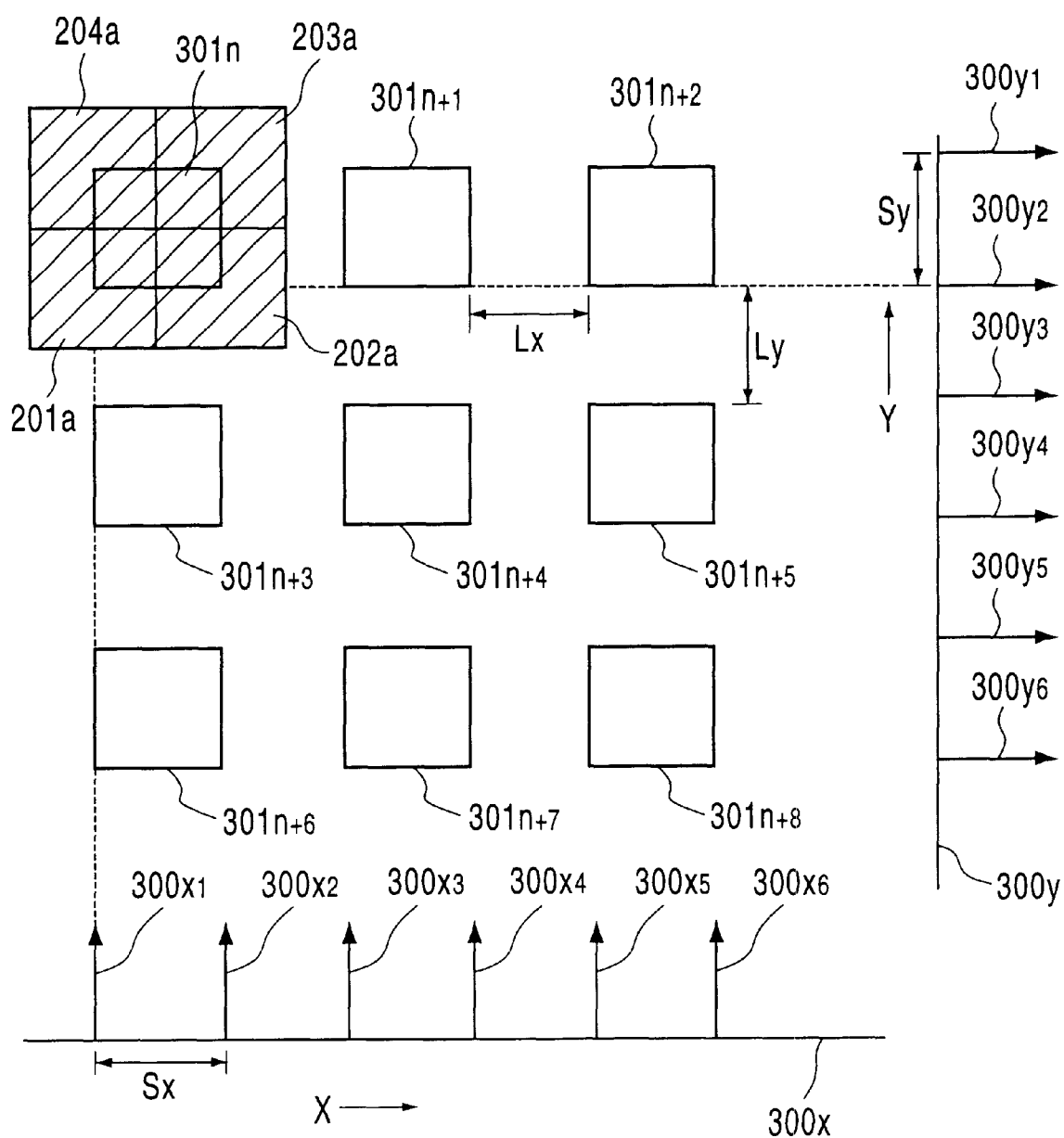
FIG. 7 is a view showing the sampling points in case of the "pixel shift" mentioned above.

FIG. 7 shows the arrangement of the pixels 301n, 301n+1, 301n+2, ... on the image-pickup surface of the CCD106, the interval 300x of the sampling points in the X-direction, and that 300y of the sampling points in the Y-direction.

On the CCD 106, the pixels 301n, 301n+1, 301n+2, ... are arranged, as shown in FIG. 7, in the X- and Y-direction with predetermined intervals Lx, Ly (Lx≦Ly).

Figure 8:
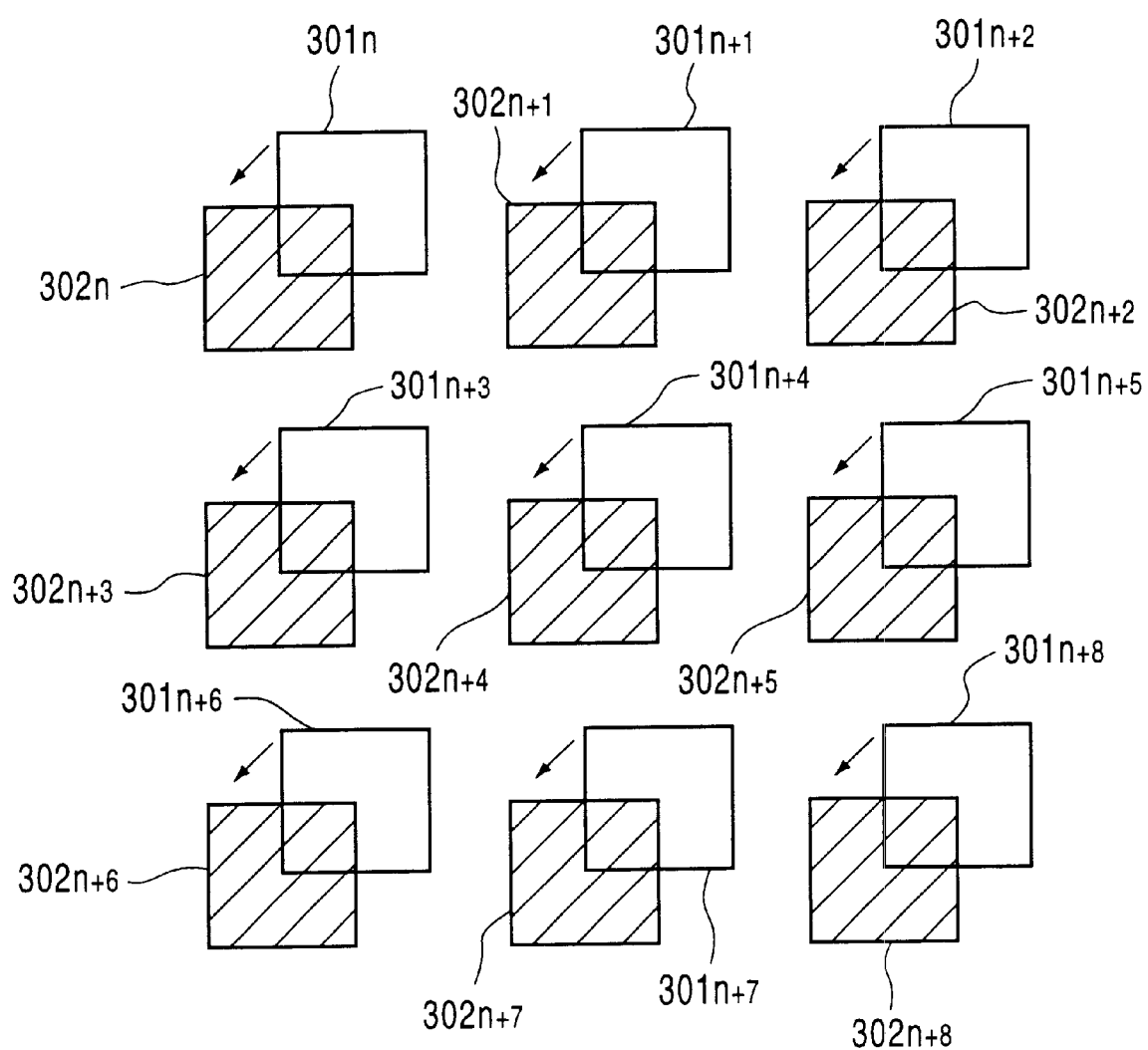
FIG. 8 is a view showing a state where the array of the photosensor elements of the CCD is shifted relative to the image.

By displacing the pixels 301n, 301n+1, 301n+2, to the positions 302n, 302n+1, 302n+2, ... by a half of the pitch of the pixels relative to the image as shown in FIG. 8, namely by a relative shift as shown in FIG. 6A, the sampling points in the X- and Y-directions are shifted to 300x1, 300y2 as indicated by arrows in FIG. 7.

Similarly, in case of a relative shift shown in FIG. 6B, the sampling points in the X- and Y-directions are shifted to 300x2, 300y2 shown in FIG. 7.

Also, in case of a relative shift shown in FIG. 6C, the sampling points in the X- and Y-directions are shifted to 300x2, 300y1 as shown in FIG. 7.

Also, in case of a relative shift shown in FIG. 6D, the sampling points in the X- and Y-directions are shifted to 300x2, 300y2 as shown in FIG. 7.

Thus, as explained in the foregoing, the memory 109 stores the image data obtained in the position 201a shown in FIG. 6A; the memory 110 stores the image data obtained in the position 202a shown in FIG. 6B; the memory 111 stores the image data obtained in the position 203a shown in FIG. 6C; and the memory 112 stores the image data obtained in the position 204a shown in FIG. 6D.

The synthesis circuit 113 synthesizes the image data stored in the memories 109–112.

More specifically, the synthesis circuit 113, for each pixel, places the pixel information of the memory 109 at the position 201a, the pixel information of the memory 110 at the position 202a, the pixel information of the memory 111 at the position 203a, and the pixel information of the memory 112 at the position 204a as shown in FIG. 7, thereby synthesizing these pixel information.

The synthesis circuit 113 executes such synthesis for all the pixels.

In this state, the distances Sx, Sy of the sampling points in the X- and Y-directions become ½ of the distances Sx', Sy' of the sampling points in the case shown in FIG. 8, so that the upper limit of the fetchable spatial frequency is doubled in the X- and Y-directions, in comparison with the case where the "pixel shift" is not conducted.

Consequently the amount of the pixel information of the synthesized image data (hereinafter called high-definition image data) obtained by the process of the aforementioned step S17 utilizing the synthesis in the synthesis circuit 113 is doubled in comparison with the amount of the original pixel information, namely the amount of the pixel information of the image data output from the A/D converter 108.

Then the control circuit 119 so controls the electronic teleconverter extracting circuit 114 to extract and enlarge a part of the image corresponding to the high-definition image data obtained in the synthesis circuit 113.

Thus, for example in case of an image extracting process as shown in FIGS. 3A and 3B, the electronic teleconverter extracting circuit 114 extracts an image of an area corresponding to ¼ of the area of the high-definition image data obtained in the synthesis circuit 113, and enlarges thus extracted image two times in the vertical and horizontal directions.

Consequently the amount of the pixel information of the extracted image data obtained in the electronic teleconverter extracting circuit 114 is equal to ½ of that of the high-definition image data obtained in the synthesis circuit 113.

However, since the amount of the pixel information of the image data before extraction is doubled in comparison with that of the original image data, the amount of the pixel information of the image data after extraction by the electronic teleconverter extracting circuit 114, though reduced to ½ by such extraction, is eventually same as the amount of the pixel information of the original image data obtained from the A/D converter 108.

Consequently the electronic teleconverter extracting circuit 114 can provide image data which are not deteriorated in the definition.

The extracted image data obtained in the electronic teleconverter extracting circuit 114, representing the image after enlargement by the electronic teleconverter, are supplied to the terminal B of the switch 115 (step S18).

Then the control circuit 119 so controls the switch 115 as to shift it to the terminal B (step S19).

By such step S19, the switch 115 outputs the image data, obtained in the electronic teleconverter extracting circuit 114, through the camera signal processing circuit 116, the encoder 117, the D/A converter 118 and the output terminal Iout as the image signal (step S20).

Then the control circuit 119 enters a waiting state until the shutter switch 136 is switched to the terminal A, namely until the shutter is turned off (step S21).

Consequently, while the shutter is turned on, there can be obtained the image data of a still image without deterioration of the definition, as explained in the foregoing.

In the following there will be given a more detailed explanation on the VAP control circuit 122.

Figure 9:
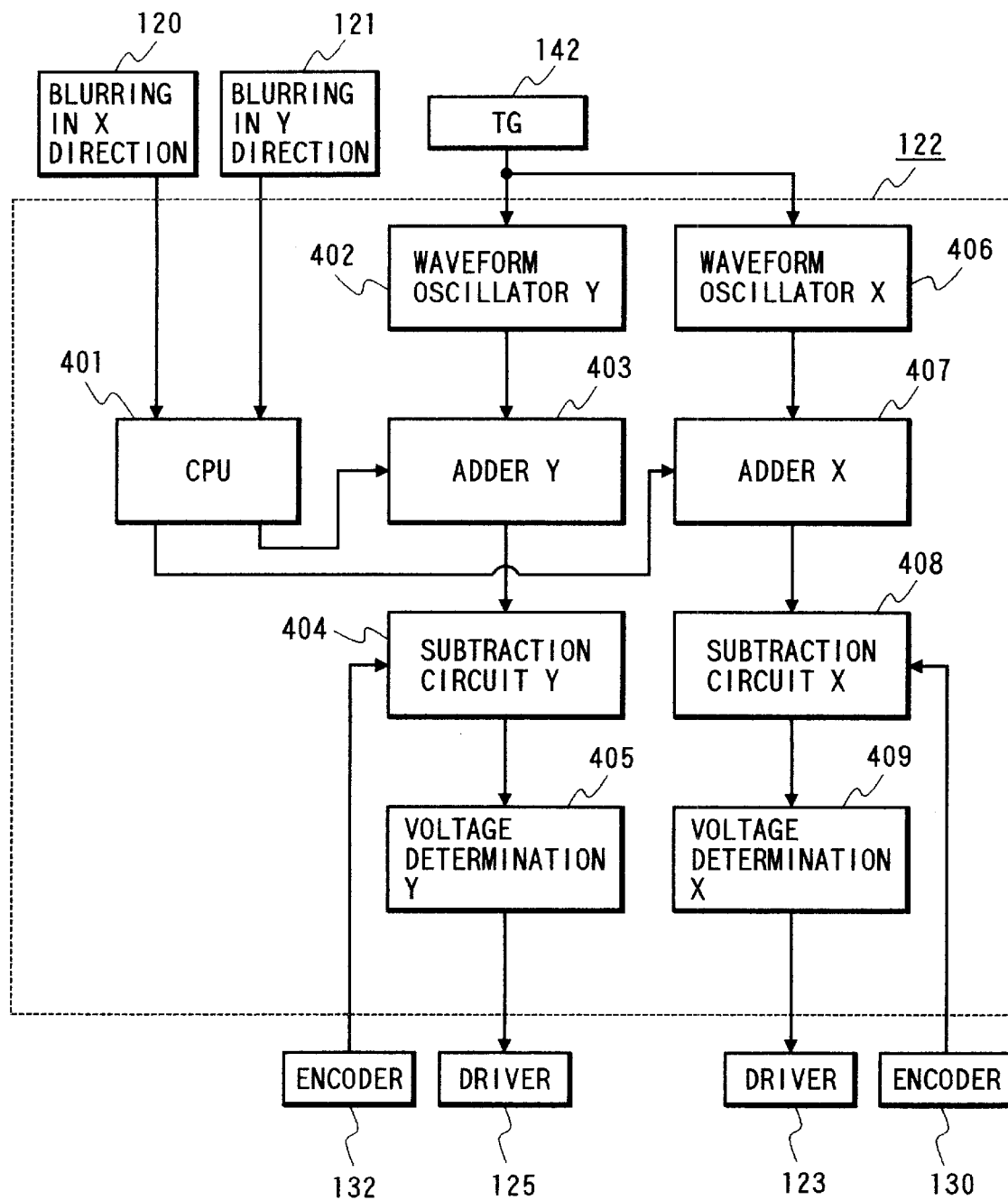
FIG. 9 is a block diagram showing the configuration in a VAP control circuit of the above-mentioned video camera.

The VAP control circuit 122 is provided, as shown in FIG. 9, with a CPU (central processing unit) 410 receiving the outputs of the X- and Y-direction blur detection circuits 120, 121 shown in FIGS. 4A and 4B; X- and Y-direction wave oscillators 402, 406 receiving the output of the TG 142 shown in FIGS. 4A and 4B; an adder 403 receiving the outputs of the wave oscillator 402 and of the CPU 401; a subtraction circuit 404 receiving the outputs of the adder 403 and of the encoder 132 shown in FIGS. 4A and 4B; a voltage determination circuit 405 receiving the output of the subtraction circuit 404; an adder 407 receiving the outputs of the wave oscillator 406 and of the CPU 401; a subtraction circuit 408 receiving the outputs of the adder 407 and of the encoder 130 shown in FIGS. 4A and 4B; and a voltage determination circuit 409 receiving the output of the subtraction circuit 408, wherein the output of the voltage determination circuit 405 is supplied to the driver 126 shown in FIGS. 4A and 4B, while the output of the voltage determination circuit 409 is supplied to the driver 123 shown in FIGS. 4A and 4B.

At first the X- and Y-direction blur detection circuits 120, 121 respectively output the amounts of hand vibration in the X- and Y-directions obtained by the aforementioned piezoelectric vibration gyro.

Based on the amounts of hand vibration in the X- and Y-directions obtained from the X- and Y-direction blur detection circuits 120, 121, the CPU 401 supplies the adder 407 for the X-direction and the adder 403 for the Y-direction with control signals corresponding to the target vertical angle position of the VAP 101, namely control signals indicating a target vertical angle capable of correcting the hand vibration.

Also based on the vertical synchronization signal from the TG 142, the X-direction wave oscillator 406 and the Y-direction wave oscillator 402 respectively supply the adders 407, 403 with signals indicating such a target vertical angle as to achieve the "pixel shift" explained above.

More specifically the X- and Y-direction wave oscillators 406, 402 respectively supply the adders 407, 403 with signals indicating such a target vertical angle as to effect the above-mentioned "pixel shift" in each pixel, in synchronization with the drive timing of the CCD driver 143.

Consequently, each of the adders 407, 403 receives a signal indicating a target vertical angle for the hand vibration correction and a signal indicating a target vertical angle for the "pixel shift".

The adder 407 adds the signal indicating the target vertical angle for the hand vibration correction from the CPU 401 and the signal indicating the target vertical angle for the "pixel shift" from the wave oscillator 406, and sends the sum to the subtraction circuit 408.

Also the adder 403 adds the signal indicating the target vertical angle for the hand vibration correction from the CPU 401 and the signal indicating the target vertical angle for the "pixel shift" from the wave oscillator 402, and sends the sum to the subtraction circuit 404.

On the other hand, the X- and Y-direction angle detection circuits 129, 131 detect the status of the vertical angle of the VAP 101 as explained in the foregoing, and the results of detection are supplied through the encoders 130, 132, as the actual vertical angle values, to the X- and Y-subtraction circuits 408, 404.

The subtraction circuit 408 calculates the difference between the target vertical angle from the adder 407 and the actual vertical angle from the encoder 130, and sends a difference signal to the voltage determination circuit 409.

Also the subtraction circuit 404 calculates the difference between the target vertical angle from the adder 403 and the actual vertical angle from the encoder 132, and sends a difference signal to the voltage determination circuit 405.

Based on the difference signal from the subtraction circuit 408, the voltage determination circuit 409 determines the voltage to be applied to the X-direction actuator 124 for driving the VAP 101 and sends such voltage to the driver 123.

Also based on the difference signal from the subtraction circuit 404, the voltage determination circuit 405 determines the voltage to be applied to the Y-direction actuator 126 for driving the VAP 101 and sends such voltage to the driver 125.

Consequently the voltages determined in the voltage determination circuits 409, 405 are applied, by the drivers 123, 125, to the X- and Y-actuators 124, 126, thereby driving the VAP 101.

Thus the light entering the VAP 101 is refracted in such a direction as to cancel the hand vibration and in such a direction as to effect the "pixel shift" as shown in FIGS. 6A to 6D.

As explained in the foregoing, the VAP control circuit 122 superposes the correction of the hand vibration and the drive for obtaining higher definition by the "pixel shift" in the VAP 101, by adding the target vertical angle values for such correction and those for the "pixel shift" in the adders 407, 403.

As explained in the foregoing, the video camera 100 is capable, when the electronic teleconverter function is turned on, of obtaining an image enlarged by the electronic teleconverter function without deterioration in the definition, since the image is sampled with a higher sampling frequency by the "pixel shift" operation and the extracted image data are obtained from thus obtained image data and subsequently enlarged.

Also the video camera 100, being so constructed as to achieve the correction of the hand vibration and a higher definition by the "pixel shift" solely through the control of the vertical angle of the VAP 101, is capable of obtaining a high-definition image after enlargement by the electronic teleconverter function without complication in the configuration, thereby improving the performance of the video camera 100.

In the above-explained VAP control circuit 122 of the video camera 100, there may be provided switches in the adders 407, 403 for switching an operation of adding the target vertical angle value for the hand vibration correction and that for the "pixel shift" or an operation of selecting either one of such target vertical angle values.

In such configuration, if the camera is for example so instructed as not to effect the correction for the hand vibration, the VAP 101 can be driven only with the target vertical angle for the "pixel shift", and a high-definition enlarged image can also be obtained in this case.

Also in the VAP control circuit 122, the wave oscillators 402, 406 and the adders 403, 407 may be provided in the CPU 401.

In the above-explained video camera 100, the signal charge accumulation in the CCD 106 is conducted for a vertical synchronization period and four image information are obtained in four vertical synchronization periods, but it is also possible to employ an image pickup device of which the image fetching period is shorter than ¼ of the vertical synchronization period and to obtain four image information within a vertical synchronization period.

In this manner there can be obtained a higher processing speed and the video camera 100 can be rendered resistant to the hand vibration and suitable for taking a moving object.

The above-explained configuration for obtaining synthesized image signal sampled with a higher sampling frequency allows to obtain, even in case of enlarging the extracted image signal obtained by extracting a part of such synthesized image signal, an enlarged image of high image quality without deterioration in the definition of the image. For example, in a system for electrically extracting and enlarging a part of the picked-up image, the image after enlargement is not deteriorated in terms of the image resolution or of the "coarseness" of the image.

Also the above-mentioned configuration, being so constructed as to obtain the synthesized image signal sampled with a higher sampling frequency utilizing the optical vibration correcting function, allows to obtain an enlarged image of high image quality without complication in the configuration of the apparatus.

In the following there will be explained a second embodiment of the present invention.

The second embodiment of the present invention provides an electronic camera capable of moving image taking and still image taking, in which the characteristics of an optical low-pass filter are switched according to the switching between the moving image taking operation and the still image taking operation, whereby the VAP effects pixel shift for obtaining an image of high image quality in the still image taking operation and it functions as an optical low-pass filter in the moving image taking operation.

In such video camera 100', the electronic teleconverter function is turned on or off in response to the selection of the moving image taking mode or the still image taking mode by a mode switch 135.

When the still image taking mode is selected, the video camera 100' provides a high-definition still image, utilizing "pixel shift" which is a method for obtaining a high-definition image utilizing a solid-state image pickup device represented by CCD, and such "pixel shift" is achieved by the refraction of the incident light in the above-explained VAP 101.

Also the video camera 100' is capable of controlling the driving frequency of the VAP 101 according to the selected mode, thereby selectively realizing a state of obtaining an effect substantially equal to the insertion of the optical low-pass filter in the optical path (hereinafter called optical low-pass filter effect) or a state in which such optical low-pass filter effect is deactivated.

FIGS. 10A and 10B are block diagrams showing the configuration of the second embodiment of the present invention, wherein components same as those in the first embodiment shown in FIGS. 4A and 4B are represented by same numbers and will not be explained further.

The configuration shown in FIGS. 10A and 10B is different from that of FIGS. 4A and 4B in the absence of the optical low-pass filter 105, the actuator 141 for inserting or retracting the optical low-pass filter 105 into or from the optical path of the phototaking optical system, and the driver 140 for driving the actuator 141. These differences are based on a fact that the optical low-pass filter effect is achieved by the VAP 101.

Also the electronic teleconverter switch 135 shown in FIGS. 4A and 4B is changed to a mode switch 135' for selecting the moving image taking mode or the still image taking mode, and the VAP controlling operations by the control circuit 119 and the VAP control circuit 122 are also made different.

In the following these control operations will be explained one by one. In the following, the operations same as those in the first embodiment will not be explained again.

At first the switch encoder 139 detects the states of a shutter switch 136 for still image taking, the mode switch 135' and a zoom switch 138 and sends the results of such detection to the control circuit 119.

Figure 11B:
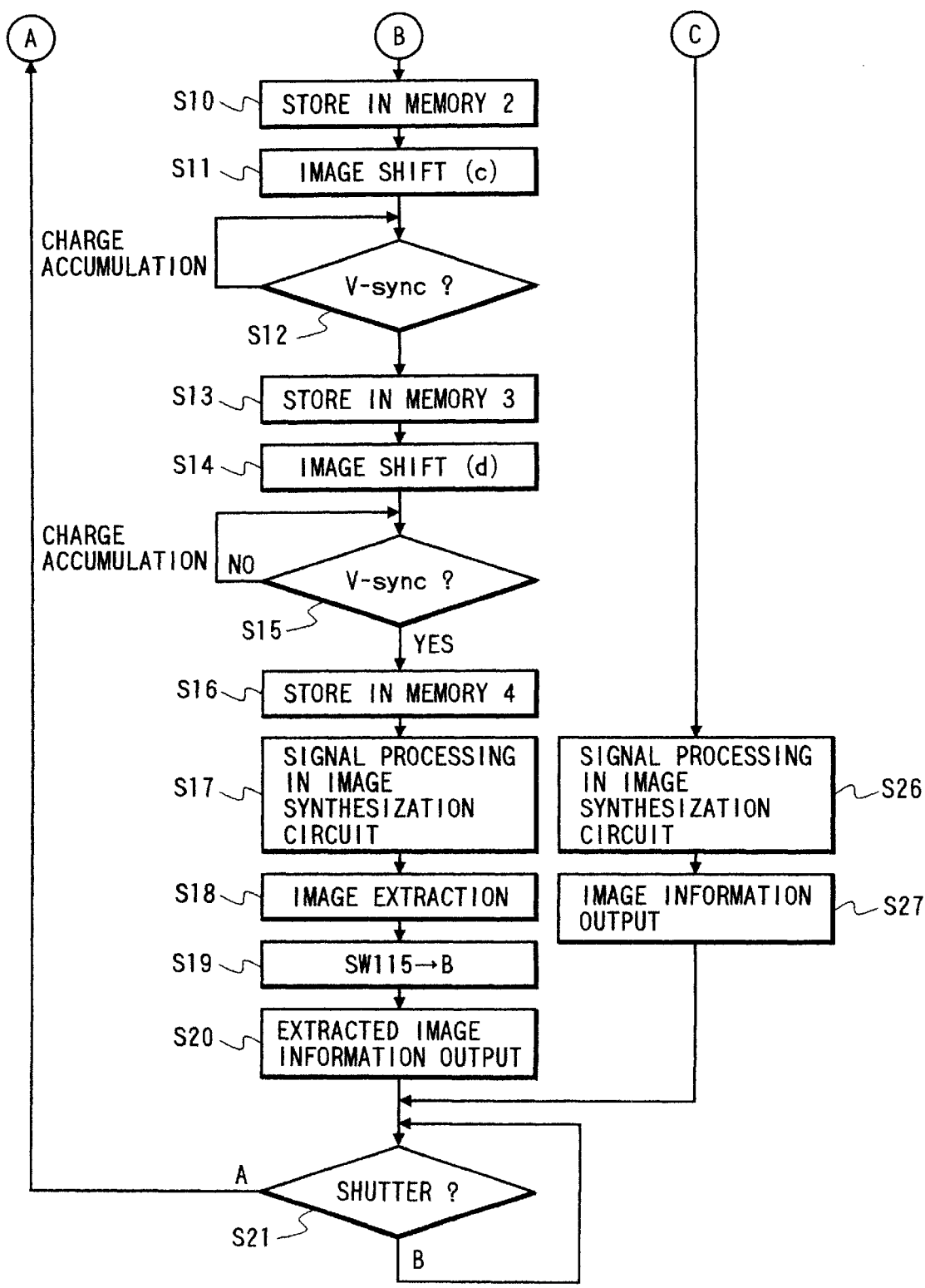
FIG. 11, which is comprised of FIGS. 11A and 11B, is flow chart showing the control sequence in the control circuit of the above-mentioned video camera.

FIGS. 11A and 11B are flow charts showing the control sequence of the control circuit 119. In the following there will be explained, with reference to the flow charts in FIGS. 11A and 11B, the control operations of the control circuit 119. In the following description, the steps equivalent to those in FIGS. 5A and 5B are represented by same step numbers.

Based on the results of detection of the switch encoder 139, the control circuit 119 discriminates whether the shutter switch 136 is shifted to the terminal A or B (step Si).

If the step S1 identifies that the shutter switch 136 is shifted to the terminal A, namely the shutter being turned off and the still image taking being not intended, the control circuit 119 controls the switch 115 so as to shift it to the terminal A (step S22) and the sequence returns to the step S1.

Thus, in this case, the image data released from the A/D converter 108, corresponding to the size of the image taken by the CCD 106, are supplied to the camera signal processing circuit 116.

On the other hand, if the step S1 identifies that the shutter switch 136 is shifted to the terminal B, namely the shutter being turned on, the control circuit 119 discriminates, based on the result of detection by the switch encoder 139, whether the mode switch 135' is shifted to the terminal A or B (step S2').

If the step S2' identifies that the mode switch 135' is shifted to the terminal A to select the moving image taking mode, namely that the electronic teleconverter function is turned off, the control circuit 119 supplies the VAP control circuit 122 with such a control signal that the driving period of the VAP 101 becomes as shown in FIG. 12.

In response to the control signal from the control circuit 119, the VAP control circuit 122 supplies the X-driver 123 and the Y-driver 125 respectively with drive signals Driv-X1, Driv-Y1 in such a manner, as shown in FIG. 12, that the drive signals Driv-X1, Driv-Y1 in the X (horizontal) and Y (vertical) direction make a cycle within the signal charge accumulation period t of an image frame in the CCD 106.

The drivers 123, 125 drive the X- and Y-actuators 124, 126 according to the drive signals Driv-X1, Driv-Y1 from the VAP control circuit 122.

By such drive of the X- and Y-actuators 124, 126, the VAP 101 is driven with a driving period as shown in FIG. 12.

Figure 13:
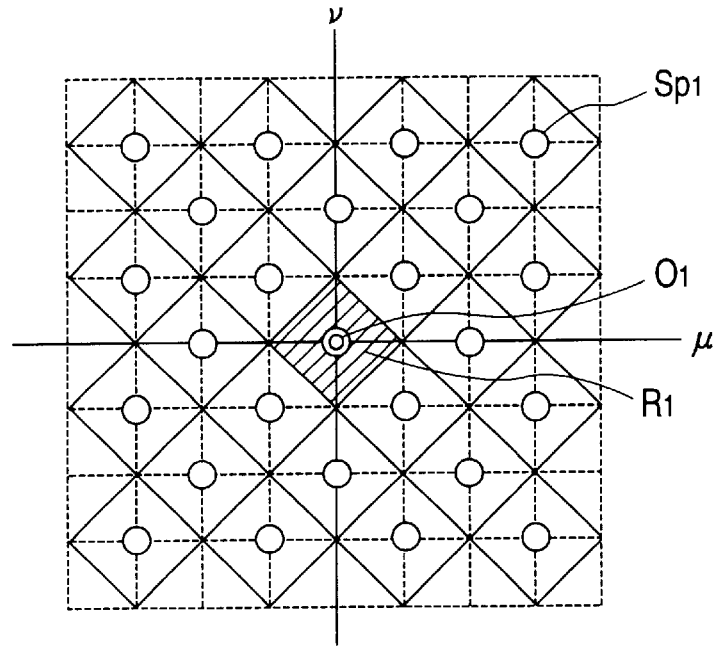
FIG. 13 is a view showing an effective sampling area in the above-mentioned moving image taking mode.

The two-dimensional spatial frequency characteristics in this case become as shown in FIG. 13, wherein a hatched area R1 around a sampling point at the original point O1 represented by a double circle, among the sampling points Sp1 indicated by circles, constitutes an effective sampling pass area, representing the spatial frequency band which does not generate fold-back noises at the sampling operation.

Consequently the driving of the VAP 101 at the driving cycles as shown in FIG. 12 allows to obtain the optical low-pass filter effect, namely an effect substantially equivalent to the insertion, into the optical path, of an optical low-pass filter for cutting off such high spatial frequencies as to generate the fold-back noises at the photoelectric conversion by the CCD 106.

Therefore, the light emerging from the zoom lens 104 is received by the CCD 106 after the elimination of the high spatial frequency components as in the case of insertion of the optical low-pass filter into the optical path, so that the photoelectric conversion of the light received by the CCD 106 does not generate the fold-back noises (step S23').

After the above-explained process of the step S23, in response to the vertical synchronization signal released from the TG 142, the control circuit 119 enters a waiting state for a vertical synchronization signal period.

During the period, the CCD 106 is driven according to the vertical synchronization signal released from the CCD driver 143 under the control of the TG 142, thereby effecting photoelectric conversion on the received light to accumulate signal charges and releasing thus accumulated signal charges in succession. The signal charges thus released from the CCD 106 are released as the image data, through the amplifier circuit 107 and the A/D converter 108.

The control circuit 119, upon detecting the output of a next vertical synchronization signal from the TG 142 (step S24), stores the image data from the A/D converter 108 in the memory 109, as still image data (step S25).

Then the control circuit 119 supplies the synthesis circuit 113 with a control signal, instructing the output of the image data stored in the memory 109 without change.

In response the synthesis circuit 113 sends the still image data, stored in the memory 109, without change, to the terminal B of the switch 115 through the electronic teleconverter extracting circuit 114 (step S26).

In this state the switch 115 is shifted to the terminal B under the control of the control circuit 119 as explained before, so that the switch 115 outputs the image data stored in the memory 109, without change.

These image data are transmitted through the camera signal processing circuit 116, the encoder 117 and the D/A converter 118 in succession and output from the output terminal Iout as the still image signal (step S27).

Then, after the process of the step S27, the control circuit 119 discriminates, based on the result of detection by the switch encoder 139, whether the shutter switch 136 has been shifted to the terminal A or B, then enters a waiting state until the shutter switch 136 is shifted to the terminal A, namely until the shutter is turned off, and, when the shutter is turned off, the sequence returns to the step S1 explained before (step S21).

Figure 14:
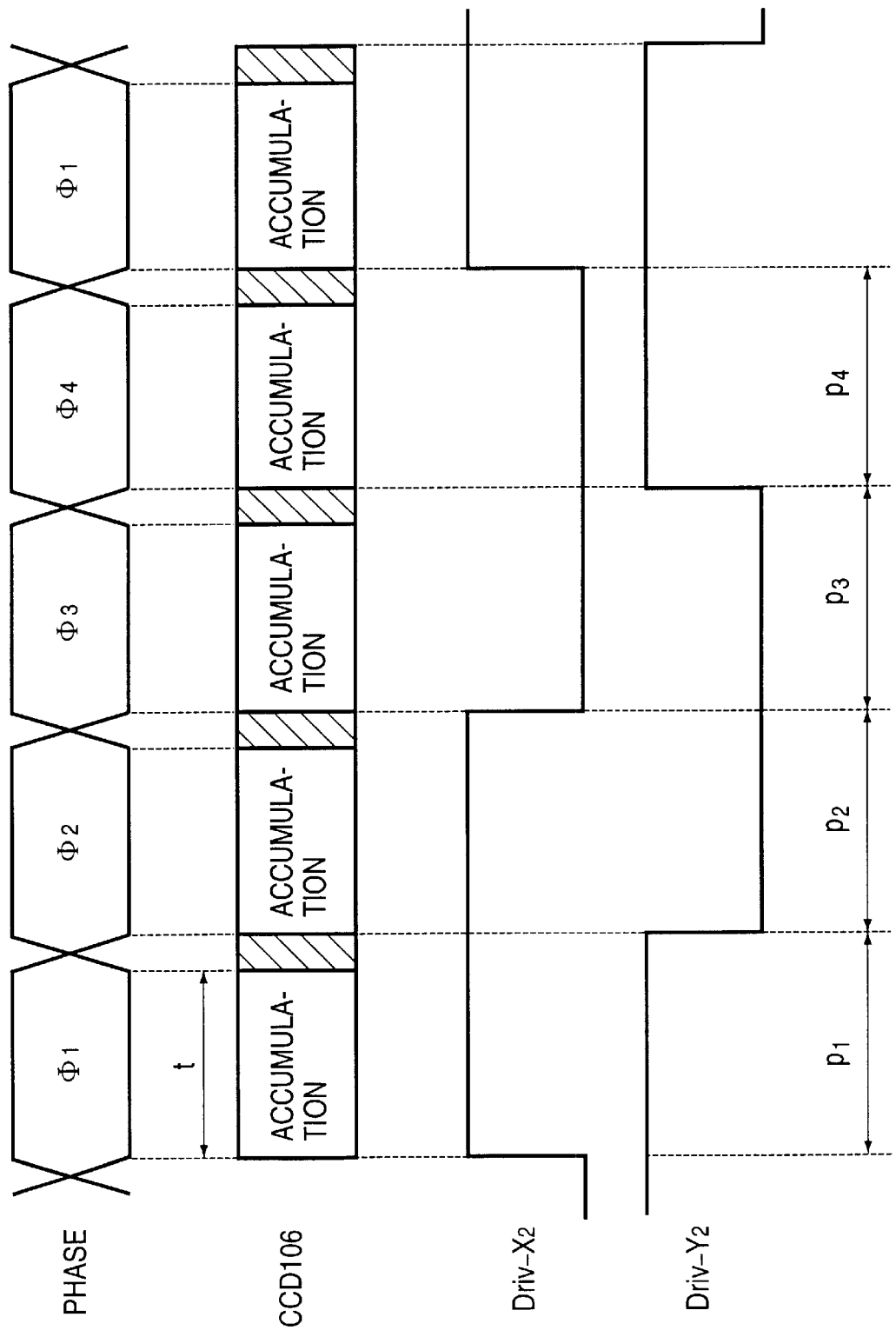
FIG. 14 is a view showing the shift sequence when the still image taking mode is selected.

On the other hand, the aforementioned discrimination of the step S2' identifies that the electronic teleconverter switch 135' is switched to the terminal B for selecting the still image taking mode, namely the electronic teleconverter function being turned on, the control circuit 119 supplies the VAP control circuit 122 with such a drive command that the VAP 101 assumes the driving cycle as shown in FIG. 14.

In response to the control signal from the control circuit 119, the VAP control circuit 122 supplies the X-driver 123 and the Y-driver 125 respectively with drive signals Driv-X2, Driv-Y2 in such a manner, as shown in FIG. 14, that the drive signals Driv-X2, Driv-Y2 in the X (horizontal) and Y (vertical) directions are varied in succession to make a cyclic sequence of four patterns of P1–P4 corresponding to the shift phases Φ1–Φ4 within the signal charge accumulation period t of an image frame in the CCD 106.

The drivers 123, 125 drive the X- and Y-actuators 124, 126 according to the drive signals Driv-X2, Driv-Y2 from the VAP control circuit 122.

By such drive of the X- and Y-actuators 124, 126, the VAP 101 is driven with a driving period as shown in FIG. 14.

Figure 15:
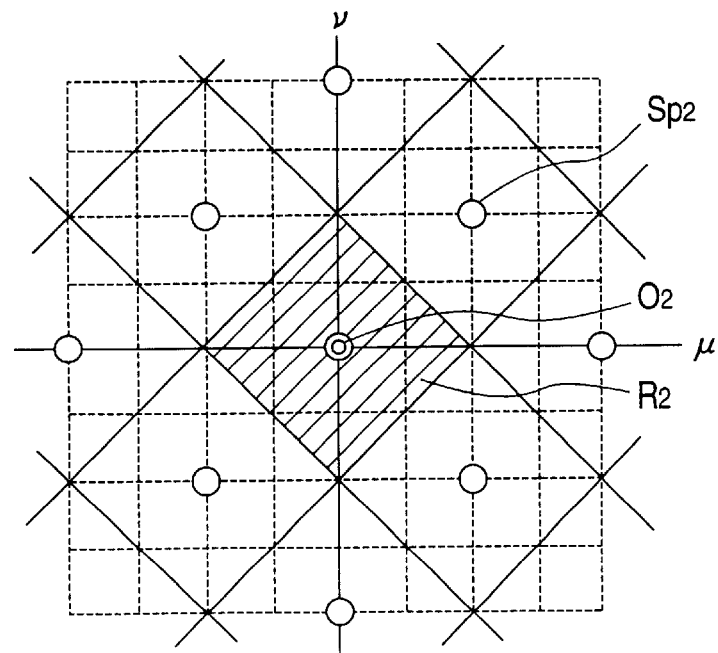
FIG. 15 is a view showing an effective sampling area in the above-mentioned still image taking mode.

The two-dimensional spatial frequency characteristics in this case become as shown in FIG. 15, wherein a hatched area R2 around a sampling point at the original point O2 represented by a double circle, among the sampling points Sp2 indicated by circles, constitutes an effective sample passing area.

The effective sample passing area R2 in this case is doubled in the axes $v$, $\mu$ in comparison with the effective sample passing area R1 for the moving image taking mode shown in FIG. 13.

In this state the optical low-pass filter effect is rendered ineffective, and the modulation transfer function (MTF) of the optical system is enlarged.

Therefore, by driving the VAP 101 at the driving cycle as shown in FIG. 14 to deactivate the optical low-pass filter effect, it is rendered possible to fetch the spatial frequencies higher than the cut-off frequency.

The light emerging from the VAP 106 is supplied through the zoom lens 104 to the CCD 106 and is subjected to photoelectric conversion therein.

As explained in the foregoing, when the still image taking mode is selected, the optical low-pass filter effect is deactivated to also fetch the higher frequencies, and a high-definition image is generated by the "pixel shift" method in the subsequent process steps (step S3').

After such process of the step S3', the control circuit 119 enters a waiting state until the release of the vertical synchronization signal from the TG 142, in order to measure the timing for the "pixel shift" (step S4).

Figure 16:
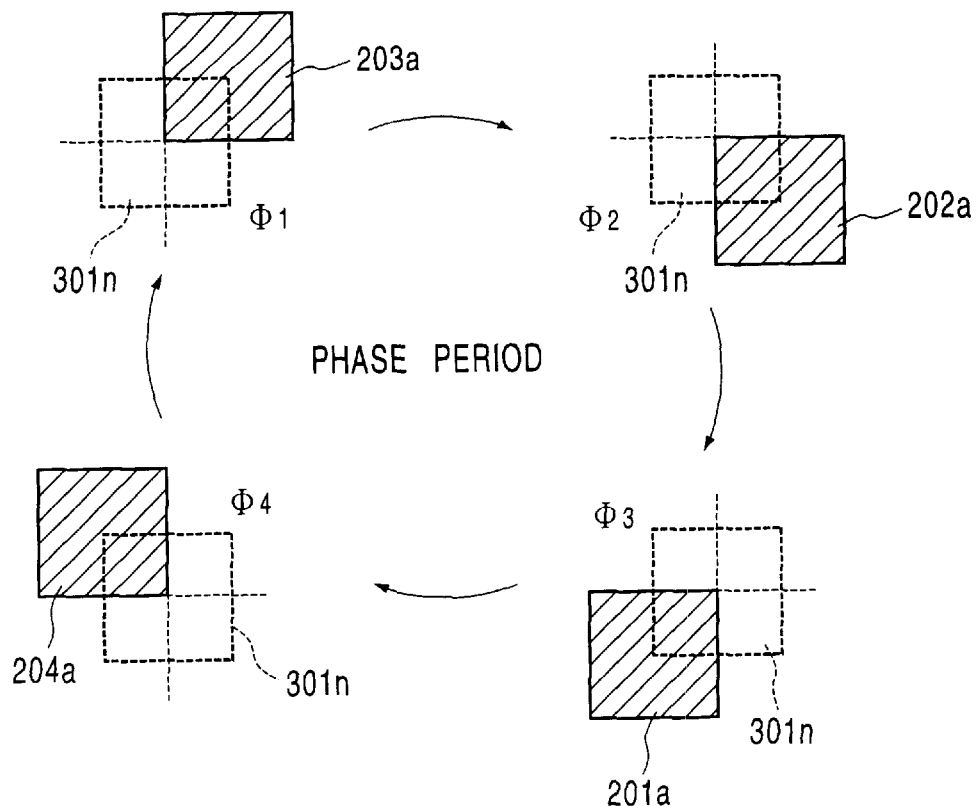
FIG. 16 is a view showing shift patterns corresponding to respective shift phases in the shift sequence of the above-mentioned still image taking mode.

Then, upon detecting the release of the vertical synchronization signal from the TG 142, the control circuit 119 supplies the VAP control circuit 122 with such a control signal that the relative positional relationship of the actual sampling points in the X- and Y-axes in the shift phases Φ1–Φ4 shown in FIG. 14 assume the relation shown in FIG. 16.

More specifically, the control circuit 119 supplies the VAP control circuit 122 with such a control signal that, by driving the VAP 101 as shown in FIG. 16, the pixel position is shifted from the reference sampling pixel position to half-pixel shifted positions 203*a*, 202*a*, 201*a* and 204*a* respectively corresponding to the shift phases Φ1–Φ4.

The drive amount of the VAP 101, required for the shift of a half-pixel distance varies according to the state of the zoom lens 104.

Figure 17:
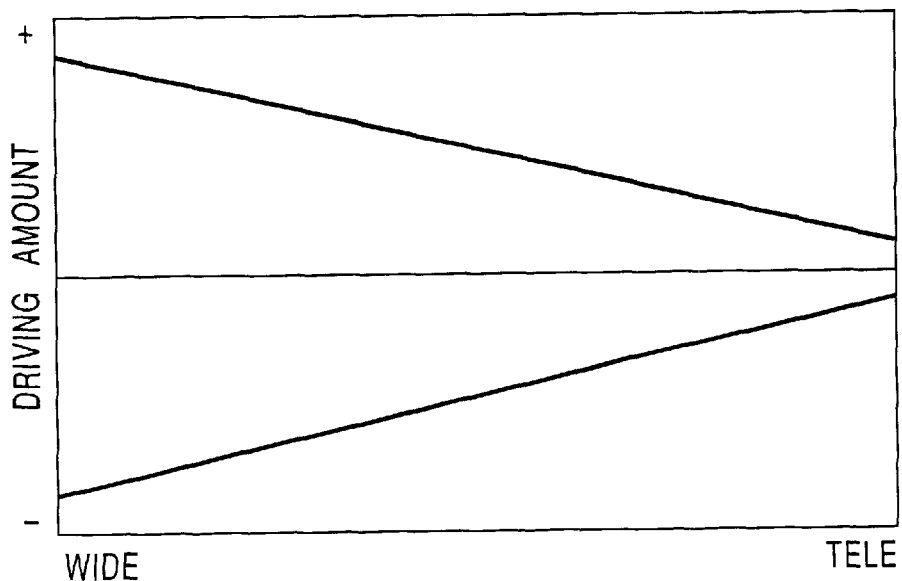
FIG. 17 is a chart showing the relationship between the VAP drive amount and the state of the zoom lens in the above-mentioned still image taking mode.

FIG. 17 shows the qualitative relationship between the state of the zoom lens 104 and the drive amount of the VAP 101. The drive amount of the VAP 101 when the zoom lens 104 is in the telephoto state is less than that when the zoom lens 104 is in the wide-angle state.

In this manner the control circuit 119 executes the "pixel shift" by half-pixel shifts as shown in FIGS. 6A–6D, by supplying the VAP control circuit 122 with such a control signal that the pixel position is shifted, relative to the image, to a position 201*a* which is distant by a half-pixel distance from the reference sampling pixel position 301*n*. Subsequently there are executed pixel shifts as shown in the steps S5 to S20 of the flow chart in FIGS. 5A and 5B, and the image information fetched in the respective pixel shift positions are synthesized in the memory to obtain a high-definition image.

As explained in the foregoing, the video camera 100' is so constructed as to set the driving cycle of the VAP 101 as shown in FIG. 12 or FIG. 14 respectively when the moving image taking mode or the still image taking mode is selected, and is therefore rendered capable, when the moving image taking mode is selected, of obtaining an effect equivalent to the case of insertion, into the optical path, of an optical low-pass filter having spatial frequency characteristics corresponding to the sampling pitch of the CCD 106, and, when the still image staking mode is selected, of sampling the image with a higher sampling frequency by the "pixel shift".

Thus, when the moving image taking mode is selected, a moving image without the fold-back noise can be easily obtained without the use of the optical low-pass filter. Also, when the still image taking mode is selected, there can be obtained a high-definition image, and an enlarged image without deterioration of the definition can be obtained by extracting and enlarging the image data from such high-definition image.

Also the video camera 100', being so constructed as to achieve the correction of the hand vibration and a higher definition by the "pixel shift" solely through the control of the vertical angle of the VAP 101, is capable of obtaining a high-definition image with the correction of the hand vibration without complication in the configuration.

In the above-explained VAP control circuit 122 of the video camera 100', there may be provided switches in the adders 407, 403 for switching an operation of adding the target vertical angle value for the hand vibration correction and that for the "pixel shift" or an operation of selecting either one of such target vertical angle values.

In such configuration, if the camera is for example so instructed as not to effect the correction for the hand vibration, the VAP 101 can be driven only with the target vertical angle for the "pixel shift", and a high-definition enlarged image can also be obtained in this case.

Also in the VAP control circuit 122, the wave oscillators 402, 406 and the adders 403, 407 may be provided in the CPU 401.

In the above-explained video camera 100', the signal charge accumulation in the CCD 106 is conducted for a vertical synchronization period and four image information are obtained in four vertical synchronization periods, but it is also possible to employ an image pickup device of which the image fetching period is shorter than ¼ of the vertical synchronization period and to obtain four image information within a vertical synchronization period.

In this manner there can be obtained a higher processing speed and the video camera 100' can be rendered resistant to the hand vibration and suitable for taking a moving object.

The above-explained configuration capable of obtaining a synthesized image signal sampled with a higher sampling frequency, by shifting the image-pickup surface of the photoelectric conversion means by a predetermined amount, relative to the object image focused on the image-pickup surface, according to the selected image processing mode, allows to obtain a high-quality enlarged image without deterioration of the definition, even in case of enlarging the image signal extracted from a part of such synthesized image signal. For example, in a system for electrically extracting and enlarging a part of the taken image, the image after enlargement is not deteriorated in terms of the image resolution or of the "coarseness" of the image. It is therefore rendered possible to constantly obtain a high-quality image, and to obtain a high-quality enlarged image even in case of extracting and enlarging a part of the still image.

Also the apparatus is so constructed as to provide an optical low-pass filter effect of the optical frequency characteristics corresponding to the sampling pitch of the photoelectric conversion means in case the moving image taking mode is selected, and, when the still image taking mode is selected, to achieve sampling with a higher sampling frequency by the pixel shift method, by a mode switching operation in the same apparatus. It is therefore rendered possible to obtain a moving image without fold-back noise when the moving image taking mode is selected, and to obtain a high-definition still image when the still image taking mode is selected. The above-mentioned optical low-pass filter effect can be attained, for example, by setting the shift of the relative position shifting means in the moving image taking mode within a period in which the photoelectric conversion means completes a sequence of half-pixel shifts in the exposure period of an image frame of such photoelectric conversion means. Also the higher definition by the pixel shift in the still image can be attained by setting the shift of the relative position shifting means in the still image taking mode in such a sequence as to effect a half-pixel shift in the exposure period of an image frame of the photoelectric conversion means.

Also an enlarged image of high image quality can be obtained, without complication of the configuration, by utilizing the optical vibration correcting function to obtain a synthesized image signal sampled with a higher sampling frequency.

In the following there will be explained a third embodiment of the present invention, enabling to read high-definition images which are different in the image size and in the aspect ratio.

At first there will be explained the background of this embodiment.

The so-called "hi-vision" television broadcasting, utilizing the high definition television (HDTV) system, is becoming popular in recent years.

Such high-vision system provides an image of very fine definition, by employing 1125 scanning lines, which are more than double in the conventional television systems, and an aspect (horizontal to vertical) ratio of 16:9, in contrast to 4:3 in the conventional television systems.

With such gradual spreading of the hi-vision system, there is increasing a demand for enjoying the image with increased impact even in the conventional television systems. For this reason there have been commercialized television monitors having an image aspect ratio of 16:9, same as in the hi-vision system, instead of the conventional aspect ratio 4:3 (such monitor being hereinafter called wide monitor).

Also in the image pickup apparatus including the consumer video cameras, there is being adopted a function of digitizing the electrical image information, obtained with an image pickup device having an aspect ratio of 4:3, to obtain an image signal corresponding to the television monitor of the aspect ratio of 16:9 (such function being hereinafter called the image size converting function).

The image pickup apparatus provided with such image size converting function does not employ an image pickup device with an aspect ratio of 16:9 but employs an image pickup device with an aspect ratio of 4:3. Such configuration is to match the television monitors of the aspect ratio of 4:3 which are already widely present in the market, and such image converting function is estimated to be needed more in the transition period of the image size of the television monitors, anticipated to continue for a considerable period of time.

Figure 18:
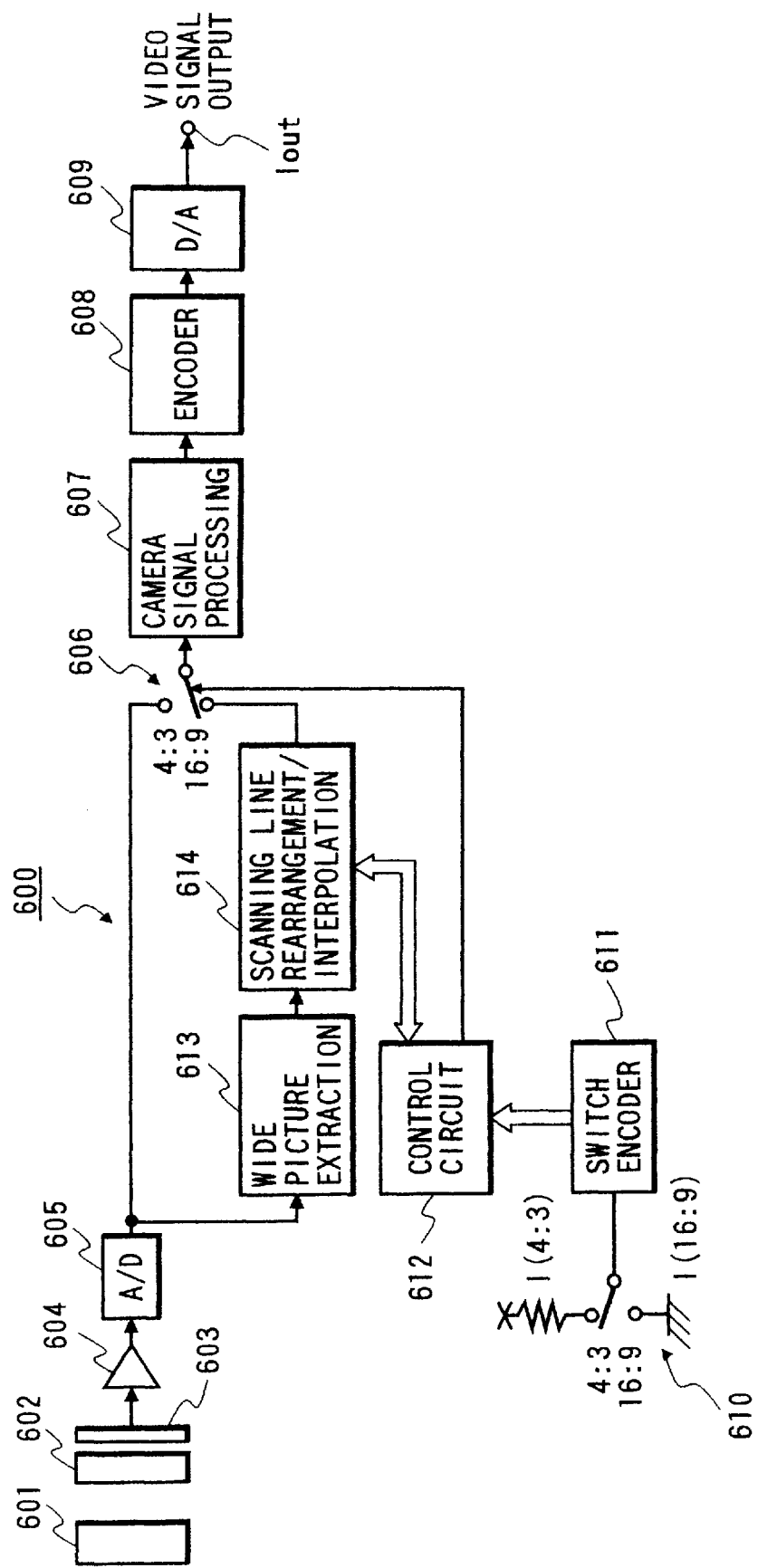
FIG. 18 is a block diagram showing the configuration of a video camera provided with an image size converting function.

FIG. 18 shows a video camera 600, as an example of the image pickup apparatus provided with such image size converting function.

As shown in FIG. 18, the video camera 600 can selectively switch, by shifting a switch 610 to a terminal I(4:3) or I(16:9), a mode (normal mode) for obtaining an image signal corresponding to the image with an aspect ratio of 4:3 from the electrical image information obtained with an image pickup device 603 corresponding to the image with an aspect ratio of 4:3, and a mode (wide image mode) for obtaining an image signal corresponding to the image with an aspect ratio of 16:9.

At first there will be explained the function of the video camera 600 set in the normal mode, by the shifting of the switch 610 to the terminal I(4:3).

At first a switch 606 is shifted to a terminal I(4:3) under the control of a control circuit 612.

The light from an object is guided through plural optical lenses 601, and an optical low-pass filter 602 coaxial therewith, then is focused on an image pickup device 603 consisting for example of a CCD (charge-coupled device) and is converted into an electrical image signal (hereinafter called photoelectric conversion).

The image pickup device 603 has an image-pickup surface of an aspect ratio of 4:3. FIG. 19 shows the arrangement of image taking pixels (hereinafter simply called pixels) on the image-pickup surface, a distance 800x of the sampling points in the X-direction and a distance 800y of the sampling points in the Y-direction.

As shown in FIG. 19, the sampling point for a given pixel 703n is defined in the X- and Y-directions by 800xn and 800yn (indicated by arrows) and can be regarded as a single point for each pixel.

Since such arrangement of the pixels in the X- and Y-directions determines the upper limit of the spatial frequency of the image that can be picked up, the frequency characteristics of the above-mentioned optical low-pass filter 602 are determined according to the range of the spatial frequency of the picked-up image mentioned above.

Consequently the video camera 600 is provided with the optical low-pass filter 602 coaxially with the plural optical lenses 601 and is so designed as to cut off the high spatial frequencies which generate fold-back noises at the photoelectric conversion by the image pickup device 603.

The image signal obtained in the image pickup device 603 is supplied through an amplifier circuit 604 to an analog/digital (A/D) converter 605.

The A/D converter 605 digitizes the image signal supplied from the amplifier circuit 604, and sends the obtained image data to the terminal I(4:3) of the switch 606.

In this state the switch 606 is shifted to the terminal I(4:3) as explained in the foregoing, so that the switch 606 supplies a camera signal processing circuit 607 with the image data obtained from the A/D converter 605.

The camera signal processing circuit 607 applies a predetermined signal processing to the image data from the switch 606, and supplies an encoder 608 with thus processed image data.

The encoder 608 applies a modulation according to a predetermined television format to the image data supplied from the camera signal processing circuit 607, and supplies a digital/analog (D/A) converter 609 with thus modulated image data.

The D/A converter 609 converts the image data from the encoder 608 into an analog television signal (image signal) for output from an output terminal Iout.

In the following there will be explained the function of the video camera 600 set in the wide image mode, by the shifting of the switch 610 to the terminal I(16:9).

As in the operation in the above-explained normal mode, the light from the object is transmitted and converted into the image data through the plural optical lenses 601, the optical low-pass filter 602, the image pickup device 603, the amplifier circuit 604, and the A/D converter 605 in succession, and is supplied to a wide image extracting circuit 613.

The wide image extracting circuit 613 applies an image extracting process, to be explained later, to the image data from the A/D converter 605, and supplies a parallel conversion/interpolation circuit 614 with thus extracted image data.

The parallel conversion/interpolation circuit 614 applies a parallel conversion and interpolation for the image information on the scanning line, as will be explained later, to the extracted image data from the wide image extracting circuit 613, and supplies the terminal I(16:9) of the switch 606 with the size-converted image data obtained by these processes.

In this state the switch 606 is shifted to the terminal I(16:9) under the control of the control circuit 612, so that the switch 606 supplies the camera signal processing circuit 607 with the size-converted image data obtained from the parallel conversion/interpolation circuit 614.

In this case, therefore, the size-converted image data obtained in the parallel conversion/interpolation circuit 614 are output as the image signal after the image size conversion, through the camera signal processing circuit 607, the encoder 608, the D/A converter 609 and the output terminal Iout.

In the following there will be explained the extracting process of the wide image extracting circuit 613, and the parallel conversion and the interpolation of the parallel conversion/interpolation circuit 614.

Figure 20A:
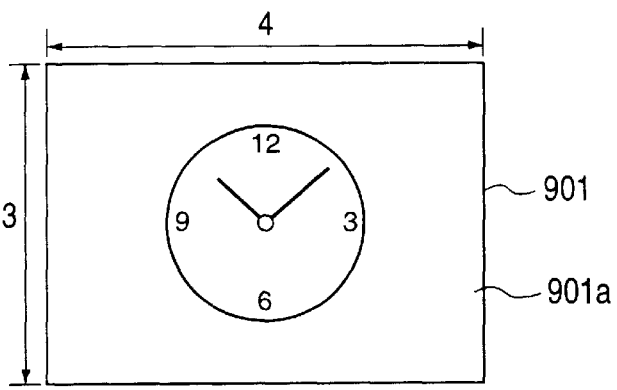
FIGS. 20A, 20B, 20C and 20D are views showing an image extracting process by the above-mentioned image size converting function.

As an example, in case the image pickup device 603 takes the image 901a in a frame 901 of an aspect ratio of 4:3 shown in FIG. 20A, namely the image 901a of a circular clock, the image data corresponding to such image 901a are supplied to the wide image extracting circuit 613.

Figure 20B:
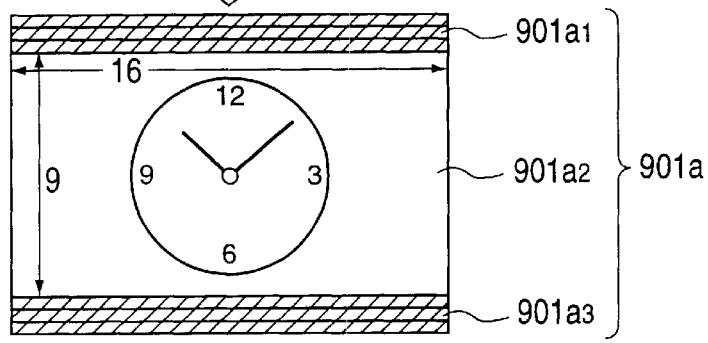

The wide image extracting circuit 613 discards the upper and lower areas 901a1, 901a3 of the 901a, as shown in FIG. 20B, thereby obtaining the image data of a remaining area 901a2 having an aspect ratio of 16:9.

The image data of such area 901a2 are supplied, as the extracted image data, to the parallel conversion/interpolation circuit 614.

Figure 21:
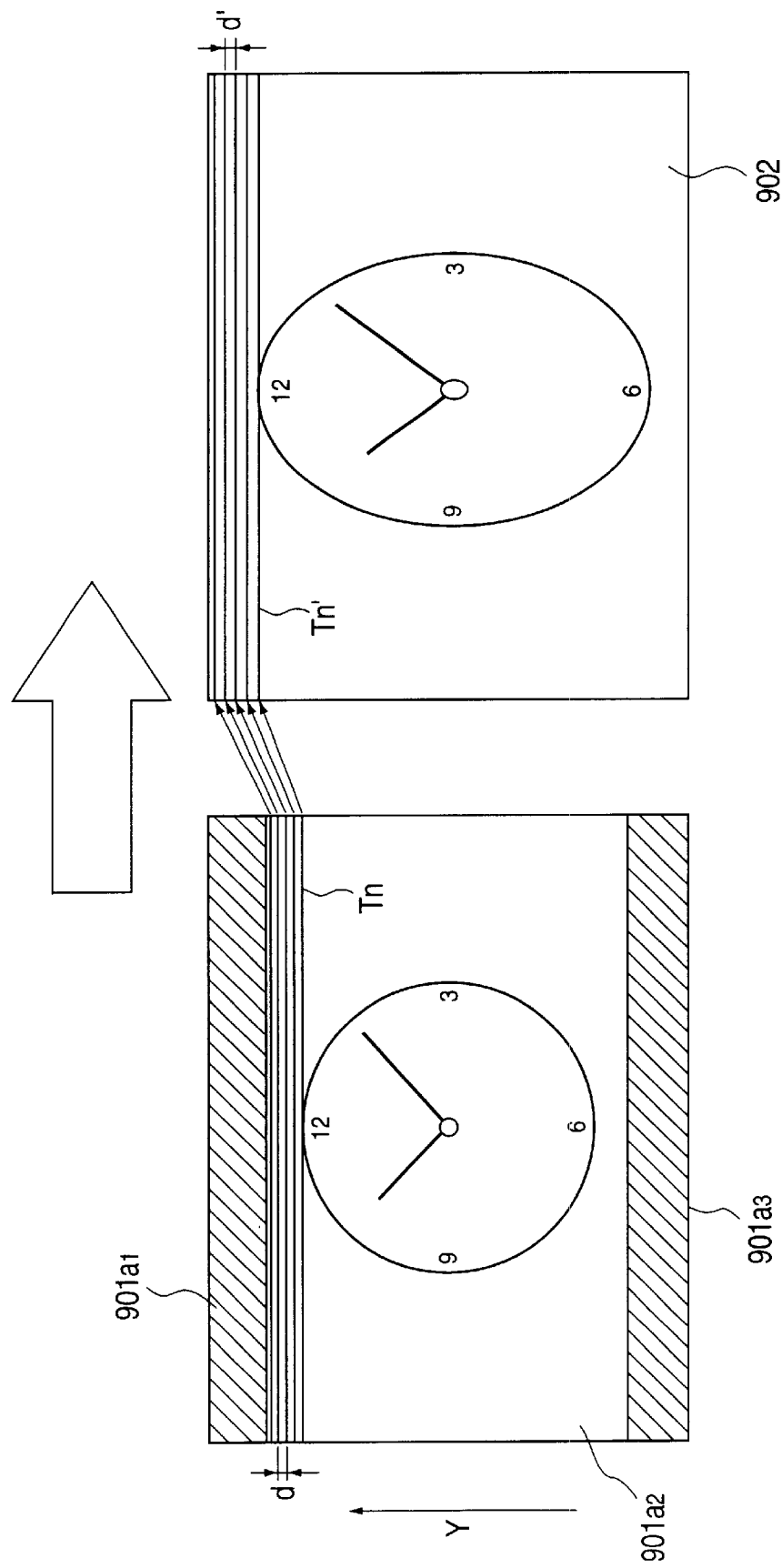
FIG. 21 is a view showing parallel displacement and interpolation of the pixel information on scanning lines, in the above-mentioned image size converting function.

The parallel conversion/interpolation circuit 614 rearranges the image data of the area 901a2, more specifically the pixel information on each scanning line Tn according to the extension ratio in the vertical (Y) direction, as shown in FIG. 21.

As a result, the pitch d' of the scanning lines Tn' after the rearrangement becomes wider than the pitch d of the scanning lines Tn prior to the rearrangement.

Then the parallel conversion/interpolation circuit 614 effects interpolation of the neighboring scanning lines after the rearrangement, by taking the average of the two pixel information present on the neighboring scanning lines, thereby providing the image data of the image 902.

FIG. 21 shows a state where the scanning lines Tn' after the rearrangement are widened with a uniform pitch d', but, in practice, such uniform widening of the pitch of the scanning lines is not possible in consideration of facts that the positions of the scanning lines on the television monitor and the number of the scanning lines in the given television system are fixed and that the expansion ratio in the vertical direction does not correspond to an integer.

Consequently the parallel conversion is generally conducted in such a manner that the pitch of the scanning lines is widened in certain portions but not in other portions.

However, even in such parallel conversion, the above-mentioned interpolation is still required in a portion where the pitch of the scanning lines is larger.

In the image 902 obtained by the parallel conversion/interpolation circuit 614, the circular clock is represented in a vertically oblong oval form.

This is because, in the image display with a wide monitor, an image with the aspect ratio of 16:9 is obtained by extending the length of horizontal scanning of the entered image signal.

The image data 901a in FIG. 20A, if displayed on the wide monitor, will show the circular clock in a horizontally oblong oval form. Therefore, the image 902, which is vertically extended in a predetermined ratio on the image area of the aspect ratio of 4:3, can be reproduced as a circular clock on the wide monitor as shown in FIG. 20D.

Figure 20C:
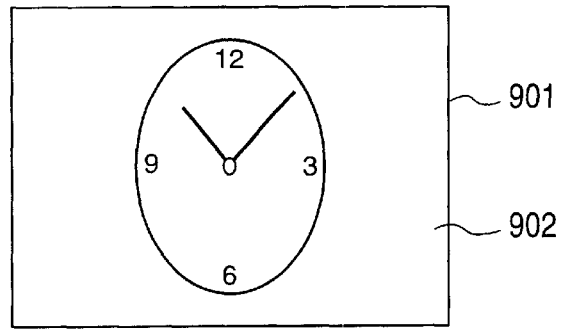
Figure 20D:
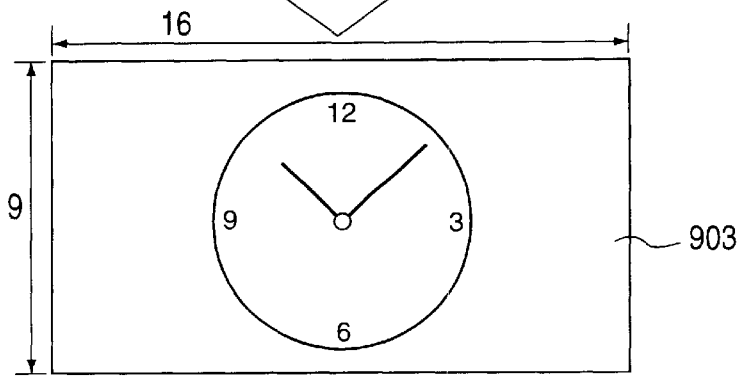

Thus the image data of the image 902 obtained in the parallel conversion/interpolation circuit 614 are output as the image signal after the size conversion through the camera signal processing circuit 607, the encoder 608, and the D/A converter 609, and such image signal is extended in the length of the horizontal scanning in an unrepresented wide monitor to provide an image display with the aspect ratio of 16:9 as shown in FIG. 20D.

However, in the above-explained video camera 600, since the image 902 shown in FIG. 20C and obtained in the parallel conversion/interpolation circuit 614 is constituted by the image information of the area 901a2 after discarding the upper and lower areas 901a1, 901a3 of the image 901a shown in FIG. 20A, the image 902 obtained after vertical extension corresponding to the wide image area of the aspect ratio of 16:9 and the image 902 of FIG. 20D displayed on the wide monitor based on such image 902 are inevitably "coarse" with a lower resolution, because of the reduction in the amount of information, despite of the addition of the scanning lines by the above-mentioned interpolation.

The present embodiment is to avoid such drawbacks and to provide an image processing apparatus and an image pickup apparatus capable of providing an image of high image quality, even in case of converting the image size by discarding a part of the image and expanding the remaining part.

The above-mentioned object can be attained, according to a preferred embodiment of the present invention, by an image pickup apparatus comprising photoelectric conversion means for converting an optical object image, focused on an image-pickup surface thereof, into an electrical image signal; a relative position shift means for shifting the relative position of the object image focused on the image-pickup surface and the image-pickup surface by a predetermined amount; plural memory means for storing the image signal obtained by the photoelectric conversion means at each shift executed by the relative position shift means; synthesis means for synthesizing the image signals stored in the plural memory means; extraction means for extracting, from the synthesized image signal from the synthesis means, a part of an aspect ratio different from that of the image-pickup surface; and conversion means for rearranging the pixel information of the extracted image signal obtained by the extraction means, thereby converting the image size to an aspect ratio same as that of the image-pickup surface.

In the following there will be explained the third embodiment of the present invention, whereby components equivalent to those in the foregoing first and second embodiments shown in FIGS. 4A, 4B, 10A and 10B are represented by same numbers.

The video camera 100" has an image size converting function, and is provided, as shown in FIGS. 22A and 22B, with a variable angle prism (VAP) 101 receiving the light from an object; a zoom lens 104, an optical low-pass filter 105 and a CCD 106 provided in succession on the optical axis of the VAP 101; an amplifier circuit 107 receiving the output of the CCD 106; an A/D converter 108 receiving the output of the amplifier circuit 107; four memories 109–112 respectively receiving the output of the A/D converter 108; a synthesis circuit 113 receiving the outputs of the memories 109–112; a wide image extracting circuit 160 receiving the output of the synthesis circuit 113; a parallel conversion/interpolation circuit 150 receiving the output of the wide image extracting circuit 160; a switch 115 receiving the outputs of the A/D converter 108 and of the parallel conversion/interpolation circuit 150; a camera signal processing circuit 116 receiving the output of the switch 115; an encoder 117 receiving the output of the camera signal processing circuit 116; and a D/A converter 118 receiving the output of the encoder 117, wherein the output of the D/A converter 118 is output through an output terminal 1out.

The video camera 100" is further provided with an X-direction blur detection circuit 120; a Y-direction blur detection circuit 121; a VAP control circuit 122 receiving the outputs of the X-direction blur detection circuit 120 and the Y-direction blur detection circuit 121; drivers 123, 125 receiving the output of the VAP control circuit 122; an X-direction actuator 124 receiving the output of the driver 123; and a Y-direction actuator 126 receiving the output of the driver 125, wherein the outputs of the X- and Y-direction actuators 124, 126 are supplied to the VAP 101.

The video camera 100" is further provided with an X-direction angle detection circuit 131; a Y-direction angle detection circuit 129; an encoder 132 receiving the output of the X-direction angle detection circuit 131; and an encoder 130 receiving the output of the Y-direction angle detection circuit 129, wherein the outputs of the X- and Y-direction angle detection circuits 131, 129 are also supplied to the VAP 101 while the outputs of the encoders 132, 130 are supplied to the VAP control circuit 122.

The video camera 100" is further provided with a driver 140; an actuator 141 receiving the output of the driver 140; a timing generator (TG) 142; and a CCD driver 143 receiving the output of the TG 142, wherein the output of the actuator 141 is supplied to the optical low-pass filter 105, and the output of the CCD driver 143 is supplied to the CCD 106.

The output of the TG 142 is supplied also to the VAP control circuit 122.

The video camera 100" is further provided with a switch encoder 170 for instructing the image size converting function, a switch encoder 139 receiving the outputs of the switch 170, and a control circuit 180 receiving the output of the switch encoder 170, wherein the control circuit 180 also receives the output of the TG 142.

The control circuit 180 controls various units of the apparatus, including the VAP control circuit 122, the driver 140, the memories 109–112, the synthesis circuit 113, the wide image extracting circuit 160 and the switch 115, based on the output of the switch encoder 139 and the TG 142.

In the above-explained configuration, the CCD 106 has the image-pickup surface of an aspect ratio of 4:3, and, upon driven by the CCD driver 143, executes photoelectric conversion on the light received by the image-pickup surface to release electric image information.

The image information released from the CCD 106 is supplied through the amplifier circuit 107 and the A/D converter 108 to the terminal I(4:3) of the switch 115, and is also stored in the memories 109–112 under the control of the control circuit 180.

The synthesis circuit 113 synthesizes the image data stored in the memories 109–112 under the control of the control circuit 180 as will be explained later in more details, and supplies the wide image extracting circuit 160 with the synthesized image data.

The wide image extracting circuit 160 applies an image extracting process, as already explained in relation to FIGS. 20A–20D, on the image data from the synthesis circuit 113 under the control of the control circuit 180, and supplies the parallel conversion/interpolation circuit 150 with the extracted image data obtained by such extracting process.

The parallel conversion/interpolation circuit 150 applies, to the extracted image data from the wide image extracting circuit 160, a parallel conversion process and an interpolation process for the image information on the scanning line as explained in the foregoing in relation to FIG. 21, and supplies the terminal I(16:9) of the switch 115 with the size-converted image data obtained by these processes.

The switch 115 is shifted to the terminal I(4:3) or I(16:9) under the control of the control circuit 160, and supplies the camera signal processing circuit 116 with the image data from the A/D converter 108 or the size-converted image data from the parallel conversion/interpolation circuit 150.

The camera signal processing circuit 116 applies a predetermined signal processing to the image data from the switch 115, and supplies the encoder 117 with thus processed image data.

The encoder 117 applies a modulation according to a predetermined television system to the image data from the camera signal processing circuit 116 and supplies the D/A converter 118 with thus modulated image data.

The D/A converter 118 converts the image data from the encoder 117 into an analog signal, and outputs such analog signal as an analog television signal (video signal) through the output terminal Iout.

Consequently the output terminal Iout releases the image signal based either on the image data released from the A/D converter 108 or on the size-converted image data from the parallel conversion/interpolation circuit 150.

In the following there will be given a more detailed explanation on the image size converting function of the video camera 100".

The video camera 100" can selectively switch, by shifting a switch 170 to a terminal I(4:3) or I(16:9), a normal mode for obtaining an image signal corresponding to the image with an aspect ratio of 4:3, and a wide image mode for obtaining an image signal corresponding to the image with an aspect ratio of 16:9.

When the wide image mode is selected, the video camera 100" provides a high-definition still image, utilizing "pixel shift" which is a method for obtaining a high-definition image utilizing a solid-state image pickup device represented by CCD, and such "pixel shift" is achieved by the refraction of the incident light in the above-explained VAP 101.

Figure 23B:
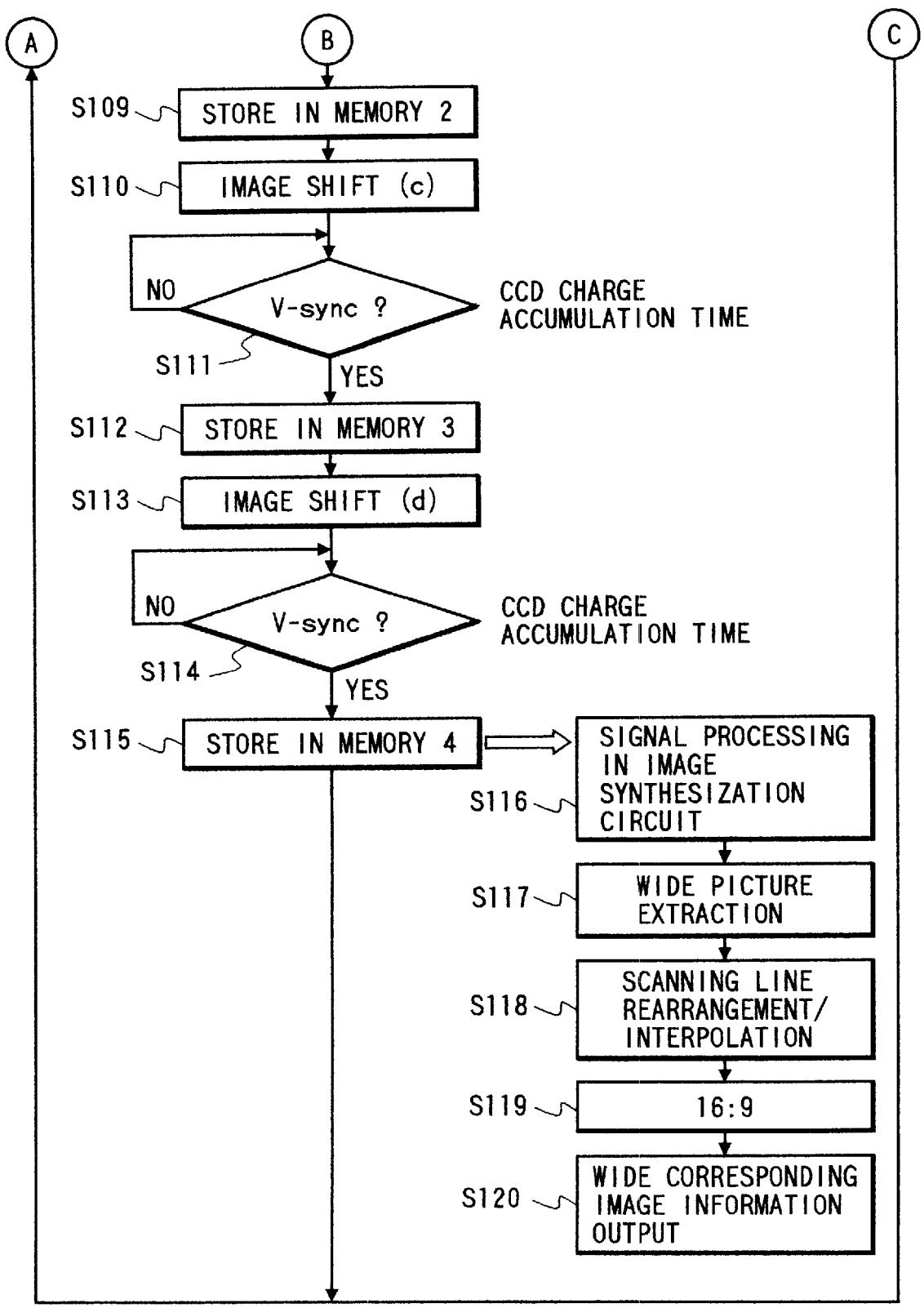
FIG. 23, which is comprised of FIGS. 23A and 23B, is flow chart showing the process in the control circuit of the above-mentioned video camera.

FIGS. 23A and 23B are flow charts showing the control sequence of the control circuit 180.

In the following there will be explained, with reference to the flow charts shown in FIGS. 23A and 23B, the function of the video camera 100" under the control of the control circuit 180.

At first the switch encoder 139 detects the states of the switch 170, and supplies the control circuit 180 with the result of such detection.

Based on the result of detection of the switch encoder 139, the control circuit 180 discriminates whether the switch 170 is shifted to the terminal I(4:3) or I(16:9) (step S101).

If the step S1 identifies that the switch 170 is shifted to the terminal I(4:3), namely the normal mode being selected, the control circuit 180 supplies the driver 140 with such a control command as to insert the optical low-pass filter 105 into the optical path.

In response to the drive command from the control circuit 180, the driver 140 controls the actuator 141, whereby the optical low-pass filter 105 is inserted into the optical path (step S121).

Consequently, in this case, the light emerging from the zoom lens 104 is subjected to the elimination of high spatial frequency components by transmission through the optical low-pass filter 105, so that the generation of fold-back noise can be prevented at the photoelectric conversion in the CCD 106.

In this case, the finally resulting image signal is not of a high-definition image, but the optical low-pass filter 105 is inserted into the optical path in order to prevent the generation of fold-back noise at the photoelectric conversion in the CCD 106.

After the above-explained process of the step S121, the control circuit 180 outputs the image data from the A/D converter 108, corresponding to the image of an aspect ratio of 4:3, as the output image data (step S122).

Then the control circuit 180 controls the switch 115 so as to shift it to the terminal I(4:3).

Consequently, in this case, the image data obtained in the A/D converter 108 are output without change, through the camera signal processing circuit 116, the encoder 117, the D/A converter 118 and the output terminal Iout as the image signal corresponding to the image of an aspect ratio of 4:3 (step S123).

On the other hand, if the step S1 identifies that the switch 170 is shifted to the terminal I(16:9), namely the wide image mode being selected, the control circuit 180 supplies the driver 140 with such a control command as to retract the optical low-pass filter 105 from the optical path.

In response to the drive command from the control circuit 180, the driver 140 controls the actuator 141, whereby the optical low-pass filter 105 is extracted from the optical path (step S102).

In this case, therefore, the light emerging from the zoom lens 104 is focused directly on the image-pickup surface of the CCD 106, without passing through the optical low-pass filter 105.

In this situation the optical low-pass filter 105 is retracted from the optical path, in order to generate a high-definition image by also fetching the light of frequencies higher than the cut-off frequency of the optical low-pass filter 105, by means of the "pixel shift".

After such process of the step S102, the control circuit 180 enters a waiting state until the release of the vertical synchronization signal from the TG 142, in order to measure the timing for the "pixel shift" (step S103).

Then, upon detecting the release of the vertical synchronization signal from the TG 142, the control circuit 180 supplies the VAP control circuit 122 with such a control signal as to move the pixel position from 201 to 201a relative to the image, as shown in FIG. 6A.

According to such control signal, the VAP control circuit 122 controls the drivers 123, 125 to drive the X- and Y-actuators 124, 126 whereby the incident light to the VAP 101 is refracted.

Consequently the CCD 106 accumulates the signal charges obtained in a state where the relative position of the image and the pixels is shifted as shown in FIG. 6A (step S104).

The process of the step S104 is executed in a period after the release of the signal charges from the CCD 106 and before the re-start of accumulation of the signal charges.

The function of the VAP control circuit 122 will be explained later in more details.

Then the control circuit 180 enters a waiting state during a vertical synchronization period based on the vertical synchronization signal released from the TG 142, in order to accumulate, in the CCD 106, the signal charges corresponding to the pixel information after the shift, and, upon detecting the release of the next vertical synchronization signal (step S105), stores the image data obtained by the CCD 106 in a state shown in FIG. 6A in the memory 109 (step S106).

Then the control circuit 180 causes the CCD 106 to shift the pixel position relative to the image from 202 to 202b as shown in FIG. 6B, and supplies the VAP control circuit 122 with a control signal for accumulating the signal charges obtained in such shifted position.

In response to the control signal, the VAP control circuit 122 controls the drivers 123, 125 to drive the X- and Y-actuators 124, 126 whereby the incident light to the VAP 101 is refracted.

Consequently the CCD 106 accumulates the image data obtained in a state where the pixels are shifted relative to the image as shown in FIG. 6B (step S107).

The process of the steps S106 and S107 is executed in a period after the release of the signal charges from the CCD 106 and before the re-start of accumulation of the signal charges.

The control circuit 180 thereafter controls the VAP control circuit 122 in a similar manner as in the aforementioned steps S104–S107, based on the vertical synchronization signal released from the TG 142, thereby storing the image data obtained in a state shown in FIG. 6B in the memory 110 (steps S108 and S109), also storing the image data obtained in a state shown in FIG. 6C in the memory 111 (steps S110 to S112), and storing the image data obtained in a state shown in FIG. 6D in the memory 112 (steps S113 to S115).

Through the above-explained steps S103 to S115, the memories 109–112 store the image data respectively obtained by the "pixel shift" as shown in FIGS. 6A to 6D.

Then the control circuit 180 so controls the synthesis circuit 113 as to execute the following process (step S116).

FIG. 7 shows the arrangement of the pixels arranged at reference pixel positions 201n, 201n+1, 201n+2, . . . on the image-pickup surface of the CCD 106, the interval 200x of the sampling points in the X-direction, and that 200y of the sampling points in the Y-direction.

By displacing the pixels from the reference pixel positions 201n, 201n+1, 201n+2, . . . to the positions 202n, 202n+1, 202n+2, . . . relative to the image as shown in FIG. 8, namely by a relative shift as shown in FIG. 6A, the sampling points in the X- and Y-directions are shifted to 200x1, 200y2 as indicated by arrows in FIG. 7.

Similarly, in case of a relative shift shown in FIG. 6B, the sampling points in the X- and Y-directions are shifted to 200x2, 200y2 shown in FIG. 7.

Also, in case of a relative shift shown in FIG. 6C, the sampling points in the X- and Y-directions are shifted to 200x2, 200y1 as shown in FIG. 7.

Also, in case of a relative shift shown in FIG. 6D, the sampling points in the X- and Y-directions are shifted to 200x2, 200y2 as shown in FIG. 7.

Thus, as explained in the foregoing, the memory 109 stores the image data obtained in the position 201a shown in FIG. 6A; the memory 110 stores the image data obtained in the position 201b shown in FIG. 6B; the memory 111 stores the image data obtained in the position 201c shown in FIG. 6C; and the memory 112 stores the image data obtained in the position 201d shown in FIG. 6D.

The synthesis circuit 113 synthesizes the image data stored in the memories 109–112.

More specifically, the synthesis circuit 113, for each pixel, places the pixel information of the memory 109 at the position 201a, the pixel information of the memory 110 at the position 201b, the pixel information of the memory 111 at the position 201c, and the pixel information of the memory 112 at the position 201d as shown in FIG. 7, thereby synthesizing these pixel information. The synthesis circuit 113 executes such synthesis for all the pixels.

In this state, the distances Sx, Sy of the sampling points in the X- and Y-directions become ½ of the distances Sx', Sy' of the sampling points in the case shown in FIG. 8, so that the upper limit of the fetchable spatial frequency is doubled in the X- and Y-directions, in comparison with the case where the "pixel shift" is not conducted.

Consequently the above-explained step S116 provides a high-definition image in which the amount of the pixel information of the synthesized image data obtained by the synthesis in the synthesis circuit 113 is doubled in comparison with the amount of the original pixel information, namely the amount of the pixel information of the image data outputted from the A/D converter 108.

Then the control circuit 180 so controls the wide image extracting circuit 160 to effect an extracting process as explained in relation to FIGS. 20A–20D from the high-definition image data obtained in the synthesis circuit 113.

Thus the wide image extracting circuit 160 generates extracted image data from the high-definition image data obtained in the synthesis circuit (step S117), and the parallel conversion/interpolation circuit 150 generated the size-converted image data from the extracted image data generated in the wide image extracting circuit 160 (step S118).

Then the control circuit 180 controls the switch 115 so as to shift it to the terminal I(16:9) (step S119).

Consequently, in this case, the size-converted image data obtained in the parallel conversion/interpolation circuit 150 are output as the output image data, which are output through the camera signal processing circuit 116, the encoder 117, the D/A converter 118 and the output terminal Iout as an image signal corresponding to the image of an aspect ratio of 16:9 (step S120).

As explained in the foregoing, when the wide image mode is selected, the amount of the pixel information of the image data obtained prior to the extraction by the wide image extracting circuit 160 is doubled, and the wide image extracting circuit 160 effects the extracting process on the image data of which the amount of pixel information is doubled. Consequently, even though the amount of the pixel information is reduced in such extracting operation, the amount of the pixel information of the size-converted image data obtained in the parallel conversion/interpolation circuit 150 is at least equal to that of the original image data, namely the image data released from the A/D converter 108.

Consequently the parallel conversion/interpolation circuit 150 can provide the size-converted image data which are not deteriorated in the definition.

The VAP control circuit 122 is same as explained before.

As explained in the foregoing, when the wide image mode is selected, the video camera 100" effects sampling of the image with a high sampling frequency based on the "pixel shift", and achieves conversion to the wide image size by extracting, from thus obtained high-definition image, the image information corresponding to an image area of an aspect ratio of 16:9, whereby the definition of the image after the size conversion is improved in comparison with that of the image before size conversion.

Significance of such high-definition image corresponding to the wide image size is important in the sense that the principal object of the hi-vision television broadcasting is in providing an image with strong impact and with virtual feeling.

Also the video camera 100", being so constructed as to achieve the correction of the hand vibration and a higher definition by the "pixel shift" solely through the control of the vertical angle of the VAP 101, is capable of obtaining a high-definition image without complication in the configuration, while correcting the hand vibration.

In the above-explained VAP control circuit 122 of the video camera 100", there may be provided switches in the adders 407, 403 for switching an operation of adding the target vertical angle value for the hand vibration correction and that for the "pixel shift" or an operation of selecting either one of such target vertical angle values.

In such configuration, if the camera is for example so instructed as not to effect the correction for the hand vibration, the VAP 101 can be driven only with the target vertical angle for the "pixel shift", and a high-definition enlarged image can also be obtained in this case.

Also in the VAP control circuit 122, the wave oscillators 402, 406 and the adders 403, 407 may be provided in the CPU 401.

In the above-explained video camera 100", the signal charge accumulation in the CCD 106 is conducted for a vertical synchronization period and four image information are obtained in four vertical synchronization periods, but it is also possible to employ an image pickup device of which the image fetching period is shorter than ¼ of the vertical synchronization period and to obtain four image information within a vertical synchronization period.

In this manner there can be obtained a higher processing speed and the video camera 100" can be rendered resistant to the hand vibration and suitable for taking a moving object.

The above-explained configuration for obtaining a synthesized image signal sampled with a higher sampling frequency, by shifting the image-pickup surface of the photoelectric conversion means by a predetermined amount relative to the image focused on the image-pickup surface, allows to obtain an image of high image quality without deterioration in the definition, even in case of extracting a part of the synthesized image signal, corresponding to an aspect ratio different from the aspect ratio of the image-pickup surface and rearranging the pixel information of the extracted image signal to obtain an image size of which aspect ratio is equal to that of the image-pickup surface. For example, in a system for electrically eliminating a part of the taken image and expanding the remaining part to convert the image into the wide image size, the image after expansion is not deteriorated in terms of the image resolution or of the "coarseness" of the image.

Also the above-mentioned configuration, being so constructed as to obtain the synthesized image signal sampled with a higher sampling frequency utilizing the optical vibration correcting function, allows to obtain a converted image of high image quality without complication in the configuration of the apparatus, while optically correcting the vibration of the photoelectric conversion means.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus comprising:

an optical unit adapted to selectively:
(1) produce a predetermined optical low-pass filter effect, or
(2) not produce the predetermined optical low-pass filter effect;

an image pickup unit adapted to convert an optical object image received through said optical unit, into an image signal; and a signal processing apparatus adapted to output selectively a motion image signal and a still image signal by changing a processing of the image signal from said image pickup unit between when said optical unit produces the predetermined optical low-pass filter effect and otherwise, wherein said optical unit produces the predetermined low-pass filter effect by moving the optical object image to a light receiving surface of said image pickup unit at a predetermined period, wherein said optical unit adds a vibration correction period of the optical object image to the predetermined period to move the optical object image to the light-receiving surface of said image pickup unit at the added period, thereby producing both the predetermined low-pass filter effect and the vibration correction of the optical object image simultaneously.

2. An apparatus according to claim 1, wherein when said optical unit moves the optical object image to the light-receiving surface of said image pickup unit at a period longer than the predetermined period and thus does not produce the predetermined optical low-pass filter effect, said signal processing apparatus processes the image signal from said image pickup unit as the still image signal.

3. An apparatus according to claim 1, wherein said image pickup unit includes a solid-state image pickup element.

4. An apparatus according to claim 3, wherein the predetermined period is set in relation to a pixel pitch of said solid-state image pickup element.

5. An apparatus according to claim 1, wherein said optical unit also produces vibration correction.

6. An apparatus according to claim 1, wherein said apparatus includes an image pickup apparatus.

7. An apparatus according to claim 1, wherein said apparatus includes a camera.

* * * * *

UNITED STATES PATENT AND TRADEMARK OFFICE
CERTIFICATE OF CORRECTION

PATENT NO.      : 6,473,120 B2
DATED           : October 29, 2002
INVENTOR(S)     : Masahide Hirasawa et al.

It is certified that error appears in the above-identified patent and that said Letters Patent is hereby corrected as shown below:

Column 1,
Line 15, "the" should be deleted.

Column 2,
Line 24, "same" should read -- the same --.

Column 5,
Lines 15, 19, 33 and 37, "is" should read -- is a --.

Column 6,
Lines 1 and 5, "is" should read -- is a --; and
Line 43, "the-output" should read -- the output --.

Column 8,
Line 1, "circuit" should read -- circuits --.

Column 11,
Line 40, "in" should read -- in a --;
Line 41, "he" should read -- the --;
Line 59, "CCD106," should read -- CCD 106, --;
Line 63, "Y-direction" should read -- Y-directions --; and
Line 64, "(Lx $\leqq$ Ly)." should read -- (Lx = Ly). --.

Column 12,
Line 67, "same" should read -- the same --.

Column 16,
Lines 11 and 39, "same" should read -- the same --; and
Line 43, "Si)." should read -- S1). --.

Column 19,
Line 32, "staking" should read -- taking --.

UNITED STATES PATENT AND TRADEMARK OFFICE
CERTIFICATE OF CORRECTION

PATENT NO. : 6,473,120 B2
DATED : October 29, 2002
INVENTOR(S) : Masahide Hirasawa et al.

It is certified that error appears in the above-identified patent and that said Letters Patent is hereby corrected as shown below:

Column 24,
Line 32, "same" should read -- the same --; and
Line 53, "Iout" should read -- Iout --.

Column 27,
Lines 56, "from" should read -- from position --; and "202b" should read -- 202a --.

Column 28,
Lines 42 and 51, "201b" should read -- 202a --;
Lines 43 and 52, "201c" should read -- 203a --;
Lines 45 and 53, "201d" should read -- 204a --; and
Line 54, "these" should read -- this --.

Column 29,
Line 38, "same" should read -- the same --.

Column 31,
Line 2, "period," should read -- period, and --.

Signed and Sealed this

Fourth Day of November, 2003

JAMES E. ROGAN
*Director of the United States Patent and Trademark Office*